(12) United States Patent
Niemela et al.

(10) Patent No.: US 12,065,070 B2
(45) Date of Patent: Aug. 20, 2024

(54) CONVERTIBLE FURNITURE SYSTEM

(71) Applicant: NB4 Brand L.L.C., Chassell, MI (US)

(72) Inventors: Cal G. Niemela, Chassell, MI (US);
Terry L. Lahti, Houghton, MI (US);
Marcus Niemela, Scottsdale, AZ (US);
Michael R. Jackson, Hancock, MI (US)

(73) Assignee: The Kingstar Company, Chassell, MI (US)

( * ) Notice: Subject to any disclaimer, the term of this patent is extended or adjusted under 35 U.S.C. 154(b) by 260 days.

(21) Appl. No.: 17/687,055

(22) Filed: Mar. 4, 2022

(65) Prior Publication Data

US 2022/0185168 A1 Jun. 16, 2022

Related U.S. Application Data

(63) Continuation-in-part of application No. 17/114,776, filed on Dec. 8, 2020, now Pat. No. 11,419,427.
(Continued)

(51) Int. Cl.
| | |
|---|---|
| *B60P 3/39* | (2006.01) |
| *A47C 17/04* | (2006.01) |
| *A47C 17/175* | (2006.01) |
| *A47C 17/48* | (2006.01) |
| *B60N 2/015* | (2006.01) |
| *B60N 2/34* | (2006.01) |

(52) U.S. Cl.
CPC ............... *B60P 3/39* (2013.01); *A47C 17/04* (2013.01); *A47C 17/1753* (2013.01); *A47C 17/1756* (2013.01); *A47C 17/48* (2013.01); *B60N 2/34* (2013.01); *B60N 2/015* (2013.01)

(58) Field of Classification Search
CPC . A47C 17/1753; A47C 17/1756; A47C 17/04; A47C 17/134; A47C 17/161; A47C 17/20; B60N 2/34; B60N 2/015; B60N 2/2209; B60N 2/3047; Y10S 5/927
USPC ....... 296/69; 297/118; 5/47, 18.1, 37.1, 118, 5/94
See application file for complete search history.

(56) References Cited

U.S. PATENT DOCUMENTS

| | | | |
|---|---|---|---|
| 2,854,672 | A | 10/1958 | Hagstrom |
| 3,600,033 | A | 8/1971 | Holdampf et al. |

(Continued)

*Primary Examiner* — Justin C Mikowski
*Assistant Examiner* — Madison Emanski
(74) *Attorney, Agent, or Firm* — Gardner, Linn, Burkhart & Ondersma LLP

(57) ABSTRACT

A convertible furniture system or futon includes a convertible frame assembly that is mountable in an interior space and is deployable between a bench configuration and a flat, bed configuration. The frame assembly includes a back frame and a bottom frame that are pivotably coupled together and coordinate to form either the bench configuration that provides a user an upright seat or the bed configuration that provides the user a flat, substantially horizontal bed to lie down on. A user can maneuver the system from the bench configuration into the bed configuration and vice versa. The system may include an actuator, such as a spring mechanism or motorized linear actuator. The system includes various support elements mounted to upright walls and the support elements may be selectively engaged to support the system in the bed or bench configurations and during deployment and stowage of the system.

23 Claims, 31 Drawing Sheets

Related U.S. Application Data

(60) Provisional application No. 62/946,123, filed on Dec. 10, 2019.

(56) References Cited

U.S. PATENT DOCUMENTS

| | | | |
|---|---|---|---|
| 4,005,898 A | | 2/1977 | Way |
| 5,394,573 A | | 3/1995 | Laughlin et al. |
| 6,138,299 A | * | 10/2000 | Roma ................ A47C 17/1756 |
| | | | 5/47 |
| 6,857,689 B2 | * | 2/2005 | Dodgen ............... A47C 20/041 |
| | | | 5/118 |
| 8,186,744 B1 | * | 5/2012 | Hanser ...................... B60P 3/39 |
| | | | 5/47 |
| 2021/0169229 A1 | | 6/2021 | Niemela et al. |

* cited by examiner

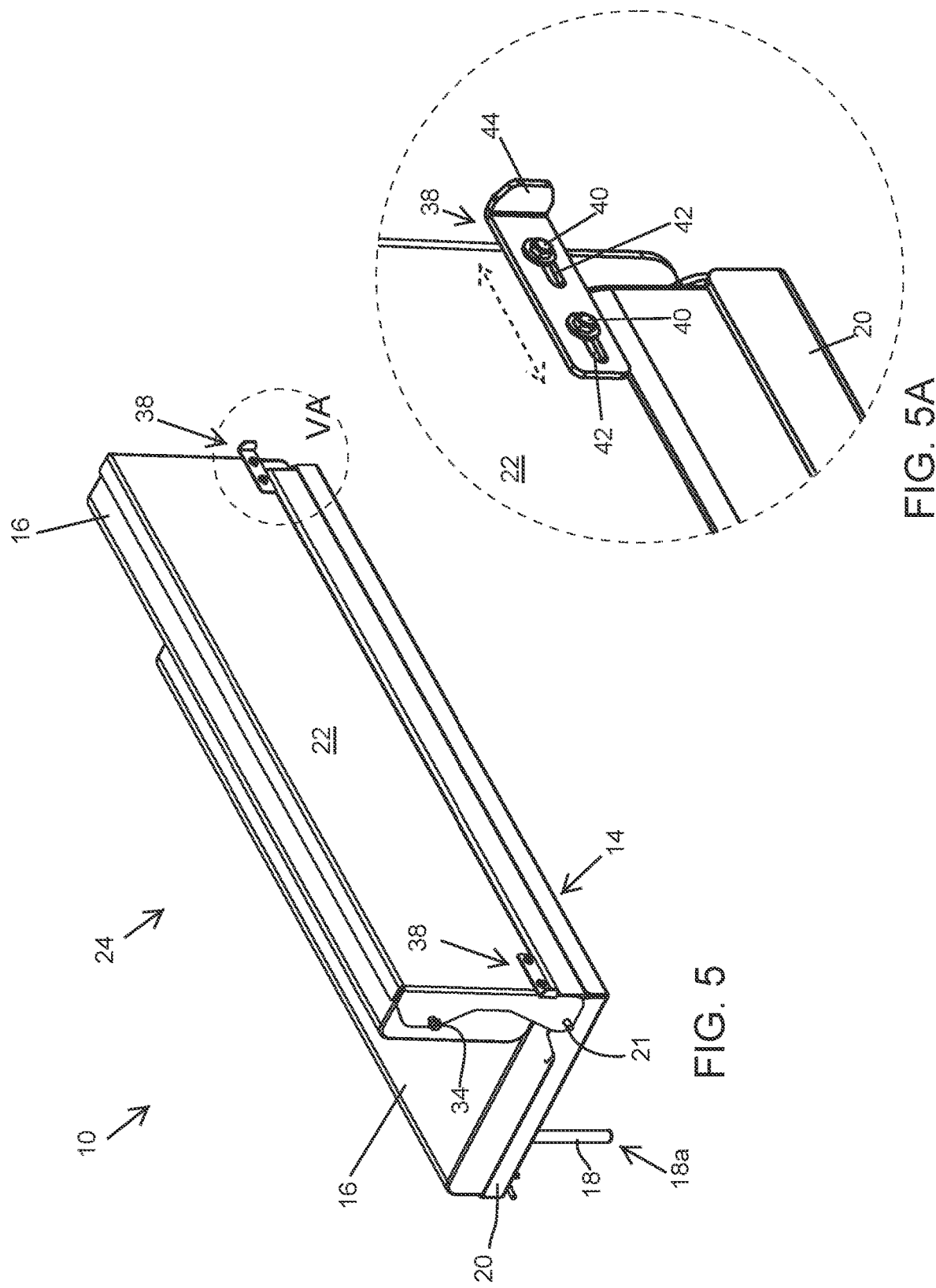

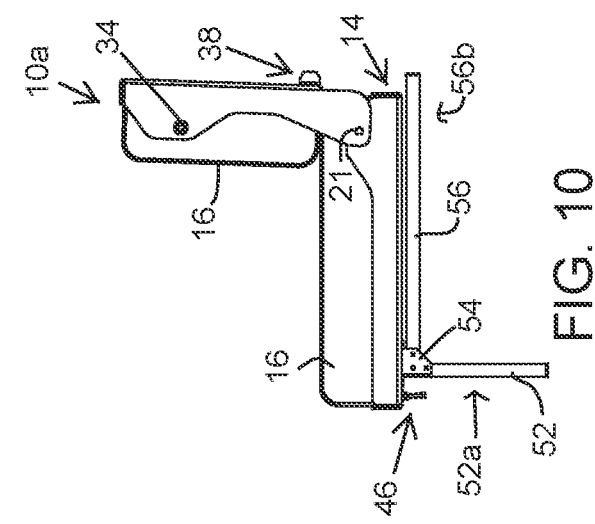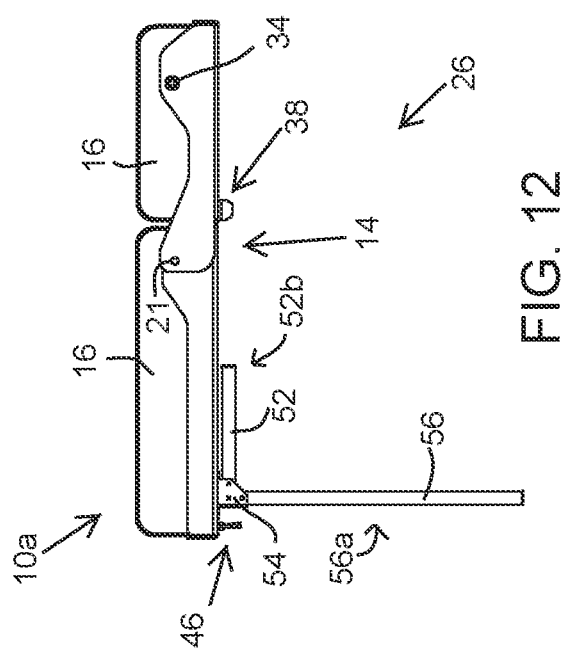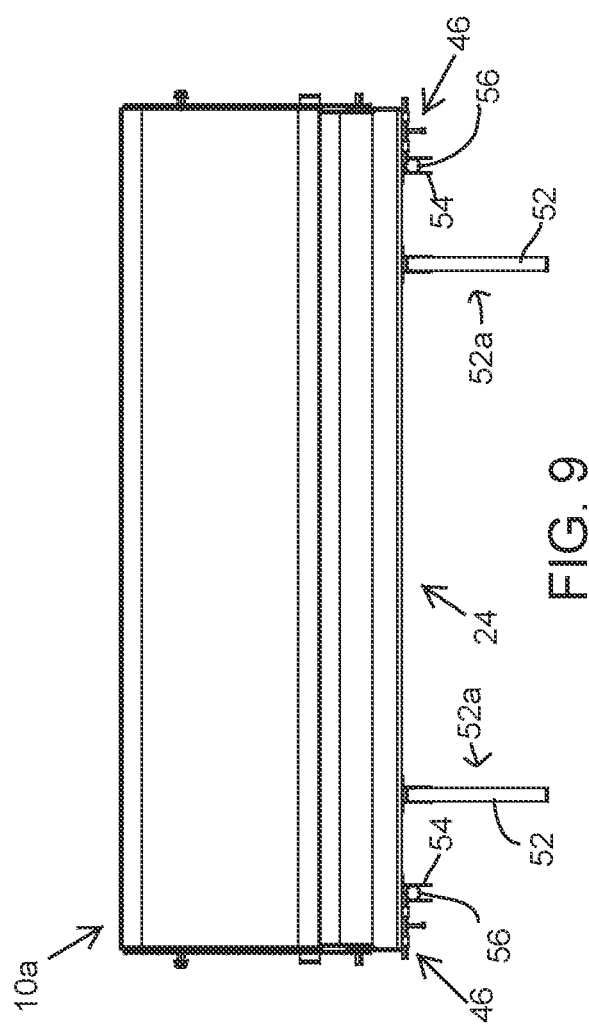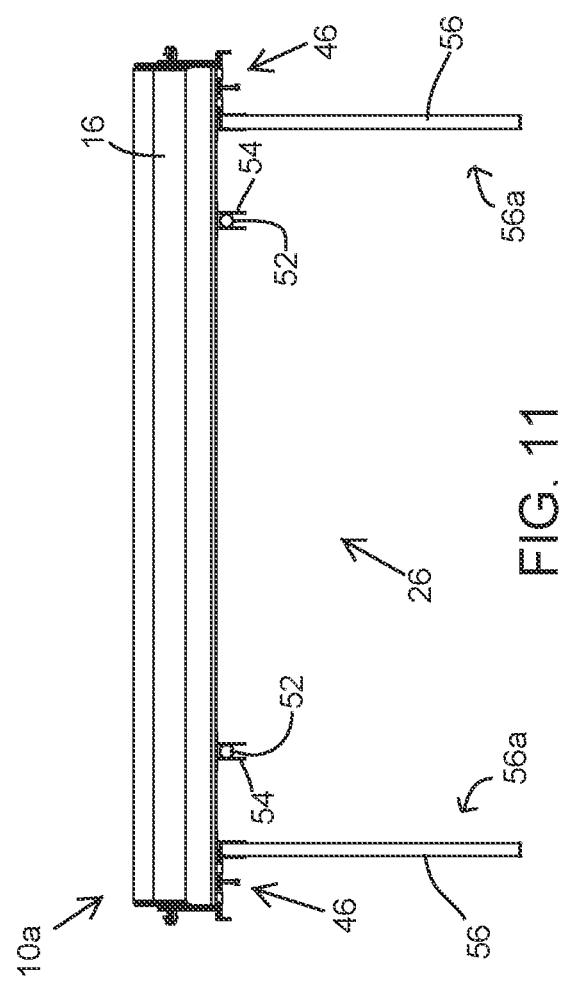

CONVERTIBLE FURNITURE SYSTEM

CROSS-REFERENCE TO RELATED APPLICATIONS

The present application is a continuation-in-part of U.S. patent application Ser. No. 17/114,776 filed Dec. 8, 2020, now U.S. Pat. No. 11,419.427, issued Aug. 23, 2022, which claims priority from U.S. provisional application Ser. No. 62/946,123, filed Dec. 10, 2019, which are each hereby incorporated herein by reference in their entireties.

FIELD OF THE INVENTION

The present invention relates to furniture such as benches, couches, and beds for campers, boats, and other recreational vehicles, or interior building spaces.

BACKGROUND OF THE INVENTION

Vehicle mounted living quarters, such as campers and truck bed mounted campers, have limited space available for furniture and other amenities. Builders or users of such living quarters must choose what types of furniture that will be placed or installed in the limited space that is available. Sofas and benches require extended space to accommodate enough seating for two or more individuals and beds require even more space than sofas to provide a space for a user or multiple users a place to lie down. Security, stability, sturdiness, and ease of use of furniture in campers are attributes that are often sacrificed in campers due to space and weight limitations.

SUMMARY OF THE INVENTION

The present invention provides a convertible furniture system for installation or mounting in a recreational vehicle or portion of a recreational vehicle, such as a truck, a truck bed, a camper, a truck bed mounted camper unit, a boat, a van, a motorhome, a mobile home, or other interior living spaces where multi-functional furniture is desired. The convertible furniture system is selectively extendable and retractable between a bench configuration and a flat/bed configuration. The furniture system provides a user the option to use the system as a seating space, such as a sofa, couch, or bench to sit in an upright position, or to use the system in a flat, substantially horizontal position, such as for a bed. The system may include various support brackets mounted to upright walls of the living space to support the system inside of the vehicle and to allow the system to be selectively maneuvered between the bench and bed configurations. An actuator, such as a spring mechanism or a motorized linear actuator, may be provided to assist and/or automatically extend or retract the system between the bench and bed configurations. The system may also include extendable support legs to support a portion of the system against a floor surface subjacent to the system.

In one form of the present invention, a convertible furniture system or futon is provided that is selectively operable to extend and retract between a bench configuration and a flat, bed configuration. The furniture system includes a convertible frame assembly having a back frame that supports a back cushion and a bottom frame that supports a bottom cushion. The back frame and bottom frame are pivotably coupled together at a hinge. The back frame and the bottom frame coordinate to define a bench when the convertible furniture system is in the bench configuration. The system is in the bench configuration when the back frame is generally upright and the bottom frame is generally horizontal relative to the upright walls of a living space and extending from the back frame. The back frame and the bottom frame coordinate to define a bed when the convertible furniture system is in the bed configuration. The system is in the bed configuration when the back frame and the bottom frame are each substantially horizontal and perpendicular relative to the upright walls and are adjacent and parallel to each other. In the bed configuration, the bottom frame occupies a position that is superjacent to the position it occupies when in the bench configuration. The frame assembly in the bed configuration may be positioned at about the same height as the height of the upper portion of the back frame when the system is in the bench configuration. The system includes a frame assembly support system at one or more upright wall of the living space, such as at each of a pair of opposing side walls of the living space. The back frame is pivotably supported at the frame assembly support system at or near the upper or proximal edge of the back frame (i.e. near the upper portion of the back frame when the system is in the bench configuration). The frame assembly support system may include one of more bench or bed supports to retain the frame assembly in either the bench configuration and/or the flat, bed configuration.

In one aspect, the frame assembly support system includes a conversion track that is operable to retain the back frame at each of the bench configuration and the flat, bed configuration, as well as movably support the back frame as the frame assembly extends and retracts between the bench and bed configurations. The conversion track may include a horizontal back frame support track and a linear actuator that is selectively operable to extend and retract the frame assembly between the bench configuration and the flat configuration. The linear actuator may include a drive motor for powered operation.

Optionally, the linear actuator includes a horizontal lead or drive screw that is rotatably supported within the horizontal support track and a drive nut moveably coupled to the drive screw. As the drive screw rotates, the drive nut moves forward or backward relative to the longitudinal axis of the drive screw, depending on the rotation direction of the drive screw. A conversion roller is coupled to the drive nut via a shaft, the roller moving along with the drive nut as the drive nut moves relative to the drive screw. The roller contacts and travels about a follower at a side end of a rear portion of the back frame. The follower may include contours extending away from the rear portion to define a desired movement path of the back frame relative to the roller and/or the back frame may define a portion of the follower. As the drive nut and the roller move forward (via rotation of the drive screw), the roller urges the back frame to move from its orientation when in the bench configuration toward its orientation when in the flat configuration. As the drive nut and the roller move rearward (via rotation of the drive screw), the roller supports the back frame as the weight of the frame assembly causes the frame assembly to move from the flat configuration toward the bench configuration.

In another aspect, the conversion track includes an oblique guide proximate a forward portion of the linear actuator. The oblique guide extends obliquely from below a forward portion of the linear actuator to above and forward of the forward portion of the linear actuator. The oblique guide supports a portion of the bottom frame and retains the bottom frame in a generally horizontal orientation when the frame assembly is in each of the bench configuration and the flat, bed configuration. The oblique guide also moveably supports the bottom frame as the frame assembly extends and retracts between the bench configuration and the bed configuration. A support roller may be coupled to a side end portion of the bottom frame to moveably support the bottom frame at the oblique guide (e.g. roll along or rest on an upper surface or portion of the oblique guide) as the frame assembly extends and retracts between the bench configuration and bed configuration. The conversion track may include a bottom frame index at or near a lower end of the oblique guide to receive and retain the support roller when the frame assembly is in the bench configuration and thereby support the bottom frame in its bench configuration position or orientation.

In yet another aspect, the conversion track includes a pair of slotted bench back brackets provided at a pair of opposing upright walls of the camper unit to slideably and pivotably couple with and support the back frame in the living space. Each of the slotted bench back brackets may include a horizontal slot that is cutout from the bracket and defining a slide slot that vertically supports a guide pin that is coupled to a side end of the back frame. The guide pin is operable to freely rotate and/or slide horizontally inside of the slide slot during deployment and stowage of the convertible furniture system. Thus, the back frame is pivotable about the guide pin as well as slideable relative to the slide slot. The slotted bench back bracket further includes a pin stop or index defined by a notch cutout of the bracket at a rear end of the slide slot. The guide pin is retained within the pin stop when the furniture system is in the bench configuration to retain the back frame in the generally upright orientation of its bench configuration position or orientation.

In still another aspect, the frame assembly support system is defined by a generally rectangular frame having a mounting surface positioned alongside an upright wall of the living space. The rectangular frame includes one or more extended portions that are inboard of the respective upright side wall and spaced apart from the mounting surface. The back frame is pivotably coupled to an extended portion of the rectangular that is located at an upright extension of an upper-rear portion of the rectangular frame. The system may include a bottom frame support pin coupled to a side end portion of the bottom frame. A bottom frame bench index may be provided by a notch cutout of an extended portion of the rectangular frame that is located at a lower-middle portion of the rectangular frame. A bottom frame flat or bed index may be provided by a notch cutout of an extended portion of the rectangular frame that is located at an upright extension of an upper-forward portion of the rectangular frame. The bench index is positioned to receive and retain the bottom frame support pin and retain the bottom frame in a generally horizontal orientation when the frame assembly is in the bench configuration. The flat index is positioned to receive and retain the bottom frame support pin and retain the bottom frame in a generally horizontal orientation when the frame assembly is in the flat configuration.

In a further aspect, the system includes a conversion assist mechanism attached between the back frame and the frame assembly support system. The conversion assist mechanism is operable to assist a user in extending and retracting the frame assembly between the bench and bed configurations. The conversion assist mechanism may include a tension spring coupled at one end to a lower-rear portion of the frame assembly support system and at an opposite end proximate the proximal or upper edge of the back frame. As such, when the frame assembly is moving from the bench configuration toward the bed configuration, the tension spring pulls downward on the proximal or upper portion of the back frame to cause the back frame to rotate such that the distal or lower portion of the back frame moves forward and toward its horizontal position or orientation that it occupies in the bed configuration. When the frame assembly is moving from the bed configuration toward the bench configuration, the tension spring is elongated as the back frame pivots toward its upright orientation, thus increasing the stored energy in the spring. As such, the spring provides a damping force or effect as the frame assembly is being stowed.

In another aspect, the frame assembly support system includes a pair of bed supports that support a side end portion of the frame assembly in the flat configuration, and a pair of bench supports that support a side end portion of the bottom frame when in the bench configuration. Each of the bed supports and bench supports are disposed on corresponding ones of the opposing upright side walls of the living space to support each side end of the frame assembly. Optionally, the bed supports and/or bench supports may include two or more support points or locations. For example, the bed supports may include a bed center support or bracket to support a center portion of the convertible frame assembly when the system is in the bed configuration and a bed end support or bracket that supports a front portion of the bottom frame when the furniture system is in the bed configuration.

In yet another aspect, the bed supports and/or bench supports may be selectively engageable to support the frame assembly at the desired configuration, such as via an extendable latch, a roller, or a support pin, for example. Optionally, the system includes an engagement element that is coupled to a portion of the frame assembly, such as at a lower or distal edge of a side end of the back frame or at a rearward or proximal edge of the side end of the bottom frame. The engagement element may be selectively operable and/or automatic. As such, the engagement element and frame assembly support system may selectively or automatically cooperate to support the frame assembly in either the bench configuration or the bed configuration. The engagement element may include a slideable latch, such as a slam latch, for example.

In still another aspect, the engagement element is selectively operable and includes a slideable hook disposed on each side of a back portion of the back frame. Each slideable hook is selectively operable to engage the bed center support bracket on the corresponding sidewall when the furniture system is in the bed configuration. The slideable hook is operable to slide from a passive position where the hook is not able to interfere with deployment and stowage of the furniture system, such as by hitting the bed center support bracket, and a hooking position where the hook is able to engage the bed center support bracket to vertically support the frame assembly when the furniture system is in the bed configuration.

In yet another aspect, the engagement element is selectively operable and includes a latch assembly disposed on each side of a forward-bottom portion of the bottom frame. The latch assembly is selectively operable to engage the bed end support bracket on the corresponding sidewall when the furniture system is in the bed configuration. The latch assembly includes a slideable latch pin that is selectively operable to slide from a passive position where the latch pin is not able to interfere with deployment and stowage of the furniture system and a latching position where the latch pin is able to engage the bed end support bracket to vertically support the forward portion of the bottom frame when the furniture system is in the bed configuration.

In yet still another aspect, the frame assembly support system includes a pair of selectively engageable bottom frame end support brackets that are each disposed on opposite sidewalls of the camper and positioned to receive a latch pin of a corresponding latch assembly to vertically support the forward portion of the bottom frame when the furniture system is in the bench configuration. The bottom frame end support brackets and the bed end support brackets are each configured to receive the same latch pin, such that the latch pin can vertically support the bottom frame at a support location on the side walls in either of the bench configuration and the bed configuration.

In another aspect, the bottom frame and the back frame each have a respective cushion-supporting elongate rectangular pan with longer edges extending between the sidewalls of the camper unit and shorter side ends that are adjacent to the sidewalls of the camper unit. Structural stiffener rails may be provided along the longer edges and the shorter side ends of the frame pans. The bottom frame may be wider than the back frame, such that the seating surface is larger than the backrest surface when the furniture system is in the bench configuration. A pair of pivot pins are located at the hinge between the bottom frame and back frame, with each pin at opposite side ends of the convertible frame assembly. The pivot pins are disposed between a rear or proximal portion of the shorter side ends of the rectangular bottom frame and the bottom or distal portion of the shorter side ends of the rectangular back frame.

In yet another aspect, the convertible furniture system includes a pair of extendable support legs coupled to a bottom portion of the bottom frame to support the bottom frame against a floor surface in both the bench and bed configurations. The extendable support legs are telescopically extendable between a shorter bench length to support the bottom frame against the floor surface when the furniture system is in the bench configuration, and a longer bed length to support the bottom frame against the floor surface when the furniture system is in the bed configuration. Optionally, a shorter first pair of extendable support legs and a longer second pair of extendable support legs are disposed on a bottom portion of the bottom frame to support the bottom frame against the floor surface when the convertible furniture system is in either the bench configuration or the bed configuration. The first (shorter) pair of extendable support legs are pivotably extendable between a bench leg extended configuration where the first pair of legs are substantially perpendicular to the bottom frame to support the bottom frame when the furniture system is in the bench configuration, and a bench leg stowed configuration adjacent to the bottom frame when the furniture system is in the bed configuration. The second (longer) pair of extendable support legs are pivotably extendable between a bed leg extended configuration where the second pair of legs are substantially perpendicular to the bottom frame to support the bottom frame when the furniture system is in the bed configuration, and a bed leg stowed configuration adjacent to the bottom frame when the furniture system is in the bench configuration.

Therefore, the illustrative embodiments of the convertible furniture system of the present invention may be selectively configured as a bench to provide upright seating or as a bed to provide a larger substantially horizontal surface, relative to the walls of a living space, on which a user may lie down on. The furniture system is deployable from the bench configuration to the bed configuration, and vice-versa. The furniture system includes various support brackets that are coupled to portions of a vehicle or other interior living space to provide vertical support to various portions of the furniture system in both the bench configuration and the bed configuration. The convertible furniture system is supports cushions to provide comfortable seating and bedding for a user. The system may include slides, guide tracks, and/or actuators (e.g. springs or motorized linear actuators) to assist in extension and retraction of the convertible furniture system during deployment and stowage. Support hooks, latches, rollers, and/or brackets are provided to secure the furniture system inside of the vehicle or interior space, such as in the bench or bed configurations.

These and other objects, advantages, purposes, and features of the present invention will become more apparent upon review of the following specification in conjunction with the drawings.

BRIEF DESCRIPTION OF THE DRAWINGS

FIG. 5 is a rear-side perspective view of the convertible furniture system of FIG. 1;

FIG. 5A is an enlarged perspective view of the region designated VA in FIG. 5;

FIG. 9 is a front elevation view of another convertible furniture system in accordance with the present invention, depicted in a bench configuration;

FIG. 10 is a side elevation view of the convertible furniture system of FIG. 9;

FIG. 11 is a front elevation view of the convertible furniture system of FIG. 9, depicted in a flat, bed configuration;

FIG. 12 is a side elevation view of the convertible furniture system of FIG. 11;

DETAILED DESCRIPTION OF THE PREFERRED EMBODIMENTS

Figure 1:
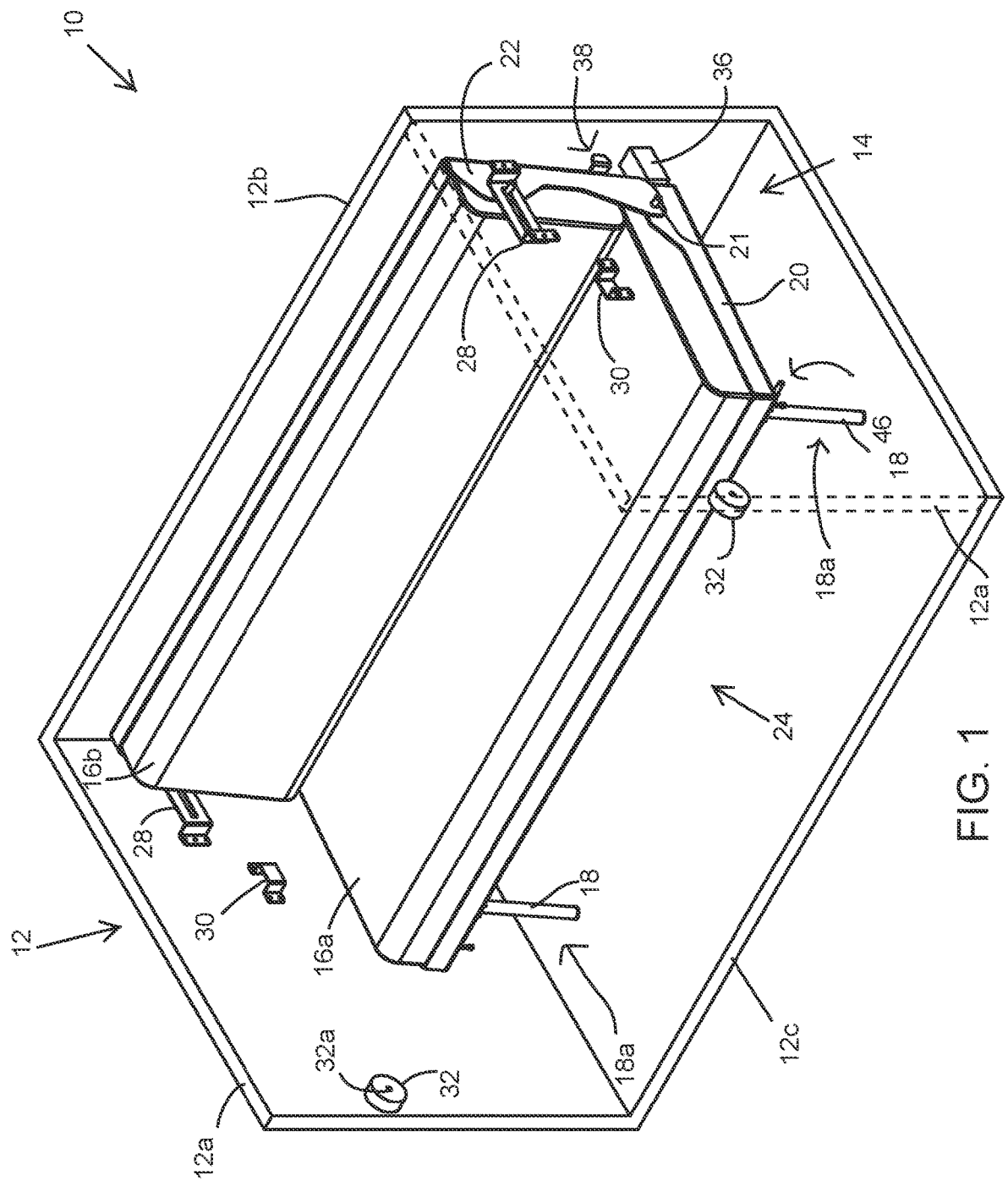
FIG. 1 is a front-side perspective view of a convertible furniture system in accordance with the present invention, depicted in a bench configuration.
Figure 2:
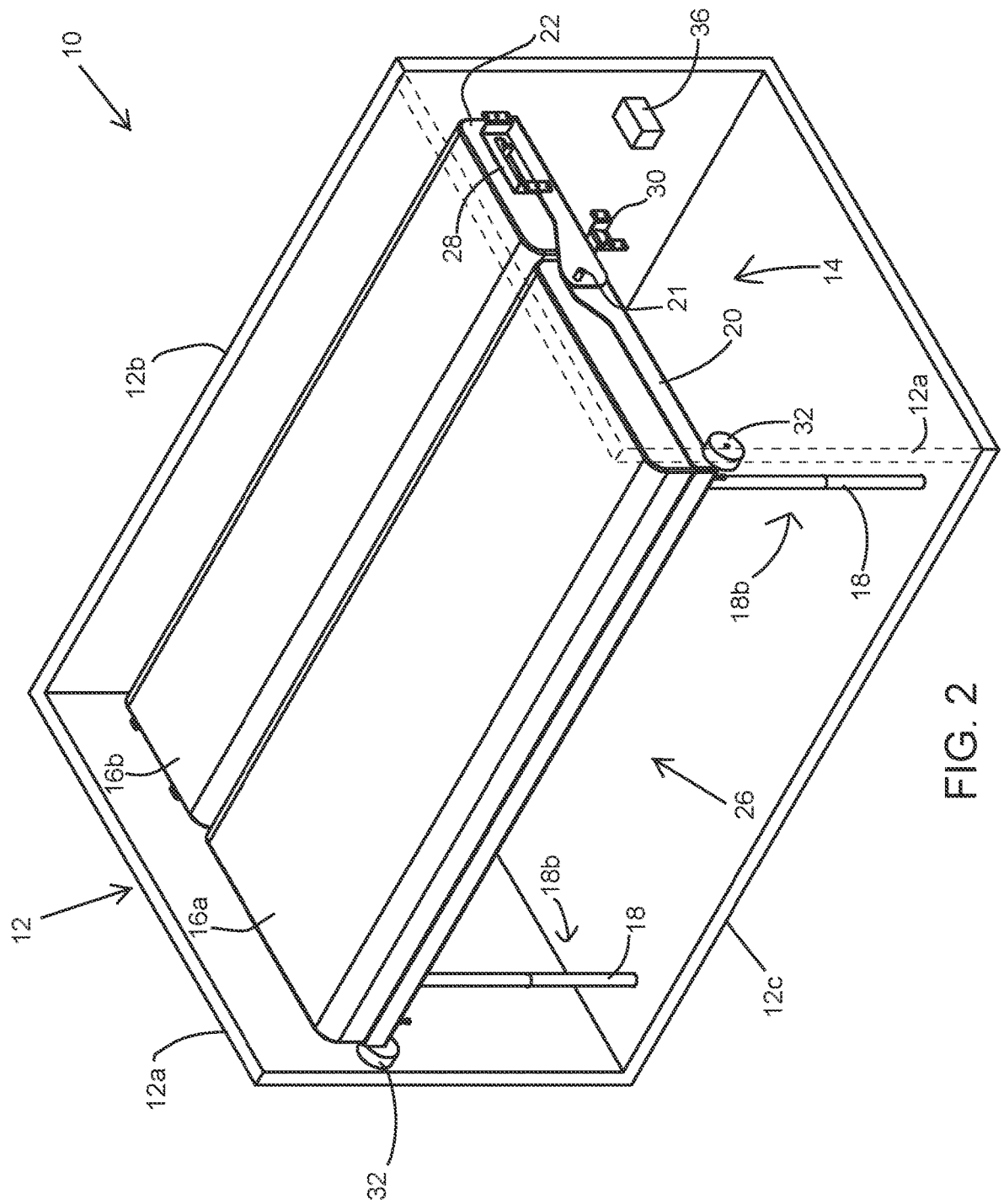
FIG. 2 is another front-side perspective view of the convertible furniture system of FIG. 1, depicted in a flat, bed configuration.

Referring now to the drawings and the illustrative embodiments depicted therein, a convertible furniture system 10 provides a seat or bench in a bench configuration 24 (FIG. 1) and a bed or lying surface in a flat or horizontal bed configuration 26 (FIG. 2). The convertible furniture system 10 may be adapted for use with various living spaces, such as recreational vehicle living quarters including campers, motorhomes, truck beds, or truck bed mounted camper units, as well as other interior living spaces where multi-functional furniture is desired. As depicted in FIGS. 3A-3G, the convertible furniture system 10 is convertible or deployable between the retracted bench configuration 24 (FIG. 3A) and the extended bed configuration 26 (FIG. 3G). FIGS. 3A-3G depict the convertible furniture system 10 in sequential stages of deployment from the bench configuration 24 to the bed configuration 26, with phantom arrows indicating the direction of pull or push required to maneuver the system 10 from one stage to the next. Conversely, the steps for deployment to the bed configuration are reversed to stow the system 10 from the bed configuration 26 to the bench configuration 24. The furniture system 10 provides a sturdy seating surface or lying surface in its different configurations, and utilizes mounting hardware that releasably and/or moveably couples it to different surfaces in the space where it is mounted, as will be described below in more detail.

Figure 6:
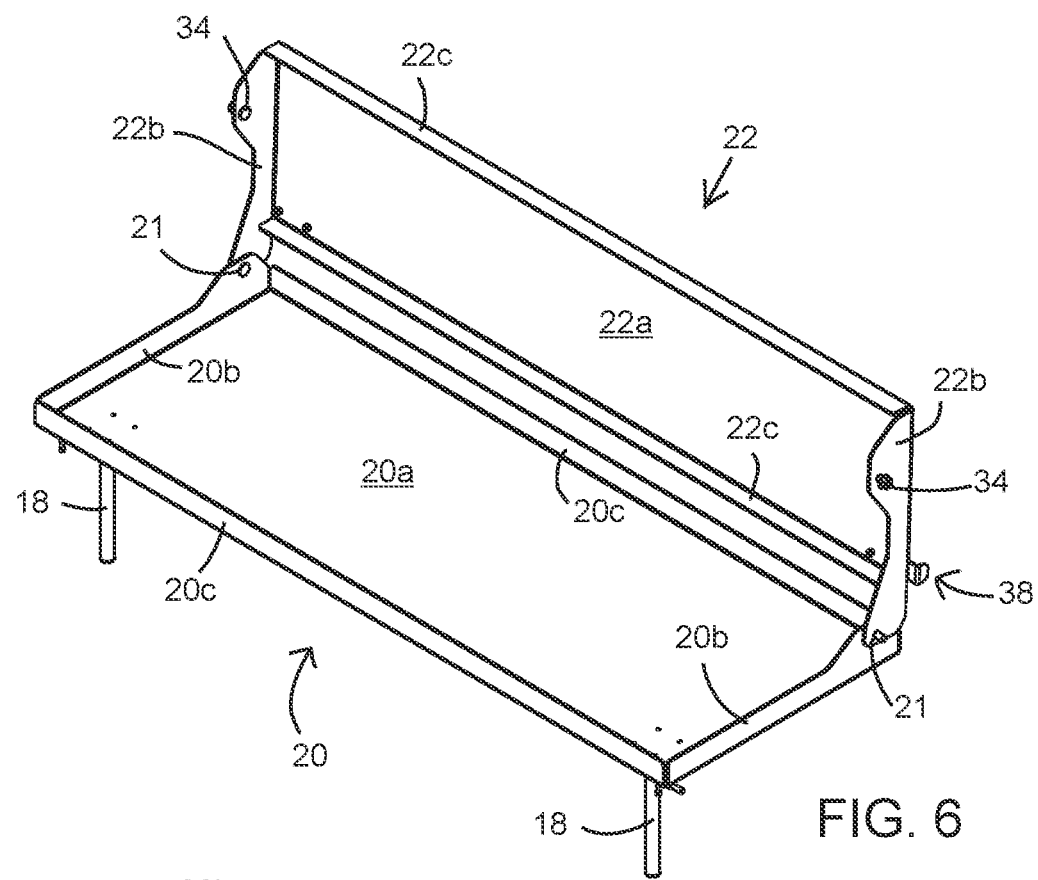
FIG. 6 is a front-side perspective view of a frame assembly of the convertible furniture system of FIG. 1.
Figure 7:
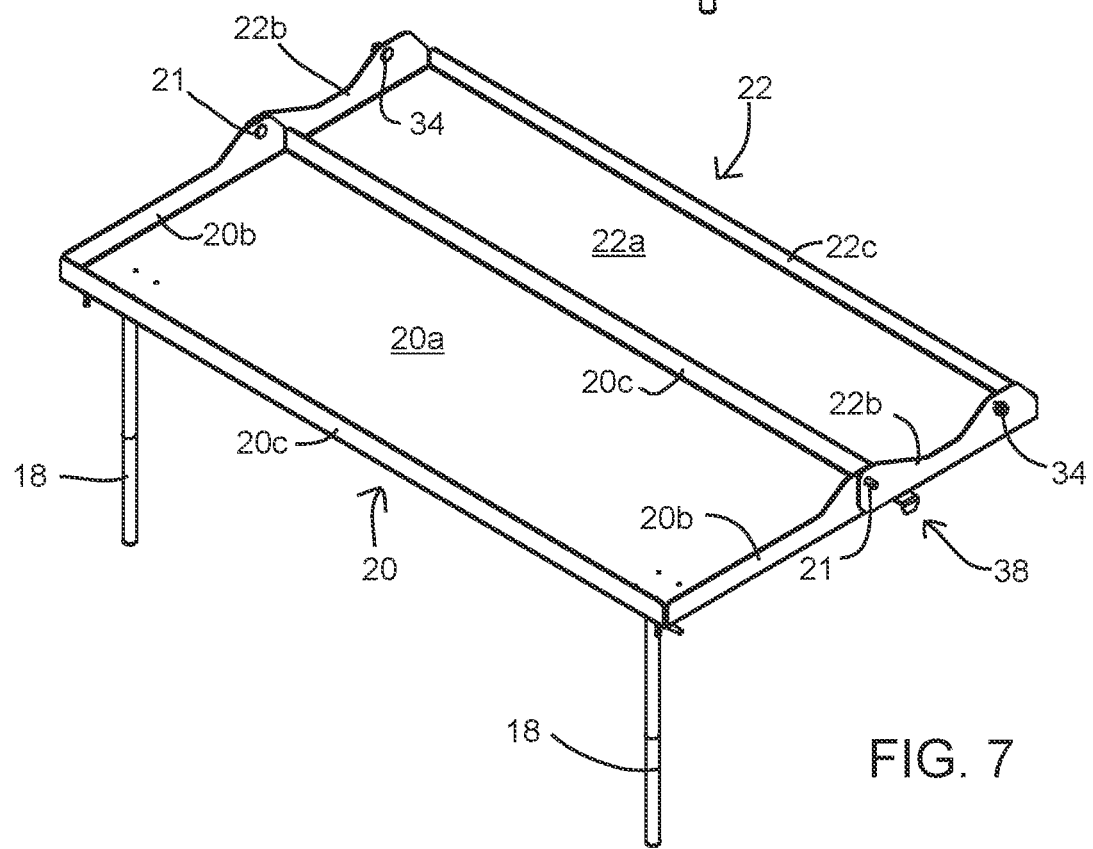
FIG. 7 is a front-side perspective view of the frame assembly of FIG. 6 depicted in the flat, bed configuration.

Referring to the illustrative embodiments of FIGS. 1-8A, a convertible furniture system or futon 10 is disposed or installed in a living space 12, depicted as a pair of opposing upright side walls 12a, a rear upright wall 12b, and a floor 12c (FIGS. 1-4). The furniture system 10 is selectively deployable between the seat or bench configuration 24 (FIGS. 1, 3A, 4-5, and 6) and a flat or substantially horizontal bed configuration 26 (FIGS. 2, 3G, and 7). The furniture system 10 includes a convertible frame assembly 14 and a plurality of cushions 16A, 16B supported by the frame assembly 14. Extendable legs 18 are provided to support the frame assembly 14 in each of the bench and bed configurations. The frame assembly 14 includes a bottom portion or bench bottom pan, body, or frame 20 pivotably coupled to a back portion or bench back pan, body, or frame 22. The bottom frame 20 and the back frame 22 coordinate to define a bench or couch in the bench configuration 24 wherein the back frame 22 is generally upright relative to the upright walls 12a, 12b such that a user can lean their back into the back frame 22 and the back frame 22 supports the users back when the user is in a seated position and wherein the bottom frame 20 is generally horizontal such that the bottom frame 20 is angled to form a support surface that can be used without sliding off. The bottom frame 20 and the back frame 22 coordinate to define a bed in the bed configuration 26 wherein the bottom frame 20 and back frame 22 are flat and generally parallel to each other and generally horizontal such that the bed 26 is angled to form a support surface that can be used without sliding off. A forward or distal portion of the bottom frame 20 defines a front edge or a foremost portion of the furniture system 10 in each of the bench configuration 24 and the bed configuration 26. An upper or proximal portion of the back frame 22 defines a top edge or uppermost portion of the furniture system 10 in the bench configuration 24 and a back edge or rearmost portion of the furniture system 10 in the bed configuration 26.

Accordingly, in the bed configuration 26, the bottom frame 20 occupies a position that is superjacent to the position it occupies when in the bench configuration 24. FIG. 1 illustrates the lower position of the bottom frame 20 in the bench configuration 24 and FIG. 2 illustrates the higher position of the bottom frame 20 in the bed configuration 26. In the illustrated embodiment, when the frame assembly 14 is in the bed configuration 26, the bottom frame 20 and back frame 22 are each elevated to a height that is equal to or about the same as the height of the upper portion of the back frame 22 when the system 10 is in the bench configuration 24. The living space 12 may be illustrative of a slide-out portion of a camper unit, for example. Optionally, the upright side walls 12a and/or rear upright wall 12b may form an integral portion of the furniture system 10. As such, upright side walls 12a and/or rear upright wall 12b may be attached to a structure within the vehicle living space 12. For example, the upright side walls 12a may be bolted, welded, or otherwise fastened to a floor of the vehicle living space 12.

As best illustrated in FIGS. 6-7, the bench bottom frame 20 includes a rectangular plate or panel 20a defining a support platform for a larger bottom cushion 16a, a side stiffener or rail 20b disposed on each short side of the panel 20a, and a long stiffener or rail 20c disposed on each long side of panel 20a. The bench back frame 22 includes a rectangular plate or panel 22a defining a support platform for a smaller back cushion 16b, a shorter side stiffener or rail 22b disposed on each shorter side end portion of the back frame 22, and a longer edge stiffener or rail 22c disposed on each longer, proximal and distal edge portions of the back frame 22. The bottom frame 20 is pivotably coupled at or near its rearward or proximal portion or edge to a bottom or distal portion or edge of each side rail 22b of the back frame 22 at a hinge or pivot pin 21.

Figure 3A:
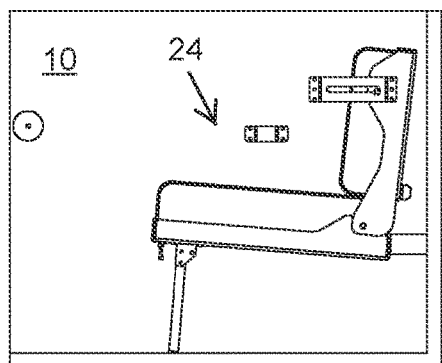
FIG. 3A-3G are side elevation views of the convertible furniture system of FIG. 1, depicting sequential steps of deploying the convertible furniture system from the bench configuration to the flat, bed configuration.
Figure 3B:
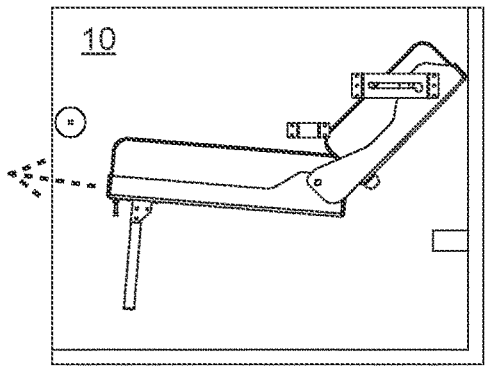
Figure 3C:
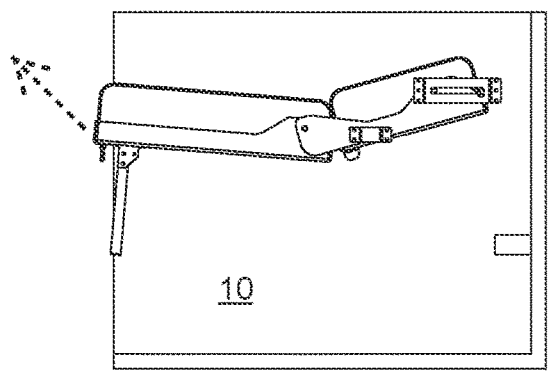
Figure 3D:
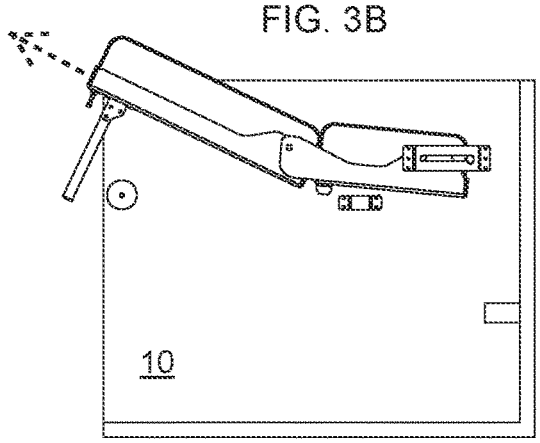
Figure 3E:
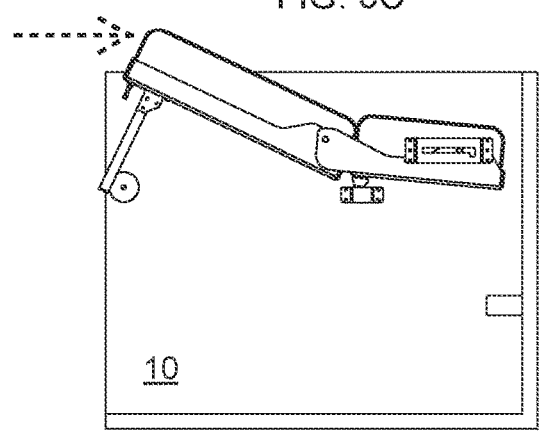
Figure 3F:
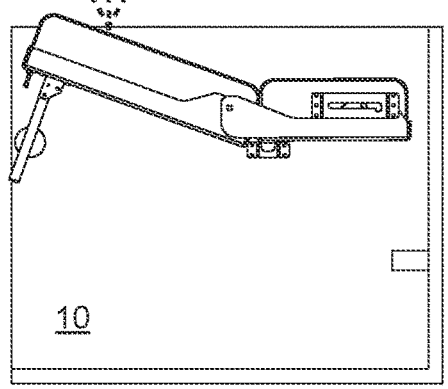
Figure 3G:
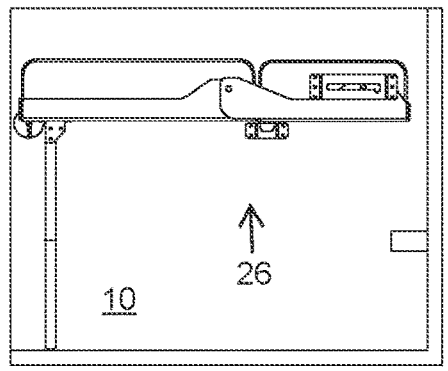

Referring to FIGS. 3A-3G, which depict a sequential deployment of the system 10, during deployment, the bottom frame 20 slides forward in the direction opposite the back frame 22 and upward away from a floor surface (FIGS. 3A-3B). As the bottom frame 20 slides forward and upward, the bottom frame 20 pulls the bottom of the back frame 22 forward causing the back frame 22 to pivot from an at least partially upright orientation to a substantially horizontal orientation (FIGS. 3B-3D). The bottom frame 20 is pulled forward and upward until it is its substantially horizontal, bed configuration 26, wherein the bottom frame 20 and the back frame 22 are adjacent and substantially parallel to define a substantially flat horizontal surface to support cushions 16 to form a bed 26. The frame assembly 14 may pivot upward and beyond the bed configuration 26 to provide access to selectively engageable bed supports 30, 32 from above the supports 30, 32 prior to securing the system 10 in the bed configuration 26, as will be described in further detail below (see system orientation in FIGS. 3D-3E). These steps are reversed to stow the system 10 from the bed configuration 26 to the bench configuration 24. While the system 10 is configured for manual deployment by a user, it will be appreciated that a motor or conversion assist mechanism may be provided to assist or perform the deployment and stowage of the system 10, such as a mechanism including a linear electric motor as described below for furniture system 210, pneumatic linear actuator, springs as described below for furniture system 110, or the like.

Figure 4:
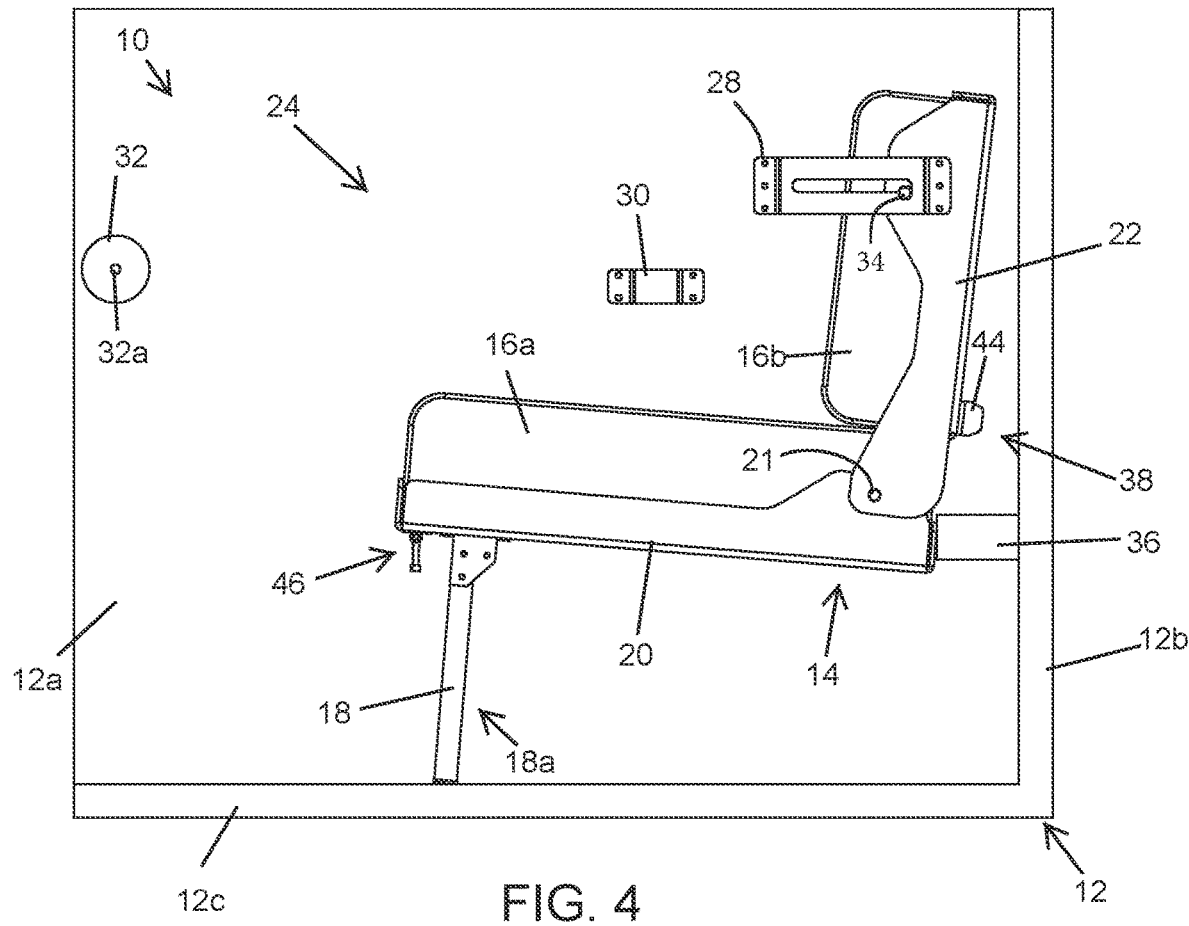
FIG. 4 is a side elevation view of the convertible furniture system of FIG. 1.

Each end of the frame assembly 14 is supported by portions of the living space 12, such as at opposing upright sidewalls 12a, at various frame assembly support elements of a frame assembly support system. The frame assembly support system includes a conversion track or guide, in the form of a pair of slotted bench back frame supports or brackets 28, and bed supports, in the form of selectively engageable bed center supports or brackets 30, and a pair of selectively engageable bed end supports or brackets 32 (FIGS. 1-4). Each slotted bench back bracket 28 is fixed to a portion of a corresponding sidewall 12a of the living space 12 and support the bench back frame 22 in an upright orientation relative to the sidewalls when the furniture system 10 is in the bench configuration 24 and support the bench back frame 22 in a flat or horizontal orientation relative to the sidewalls when the furniture system 10 is in the bed configuration 26. Each of the slotted brackets 28 includes a slide slot 28a defined by a substantially horizontal slot that is formed or established in the bracket 28 (FIG. 4). A pair of back frame guide or support pins 34 are fixedly coupled to each side end 22b at or near an upper or proximal portion 22c of the bench back frame 22 (FIGS. 6-7). The guide pins 34 are positioned and sized to be received in the slide slots 28a and to be slideable along the slide slots 28a of the sliding brackets 28. The guide pins 34 are vertically supported by the respective slotted brackets 28 at substantially all times when the pins 34 are disposed inside the slide slots 28a.

Figure 4A:
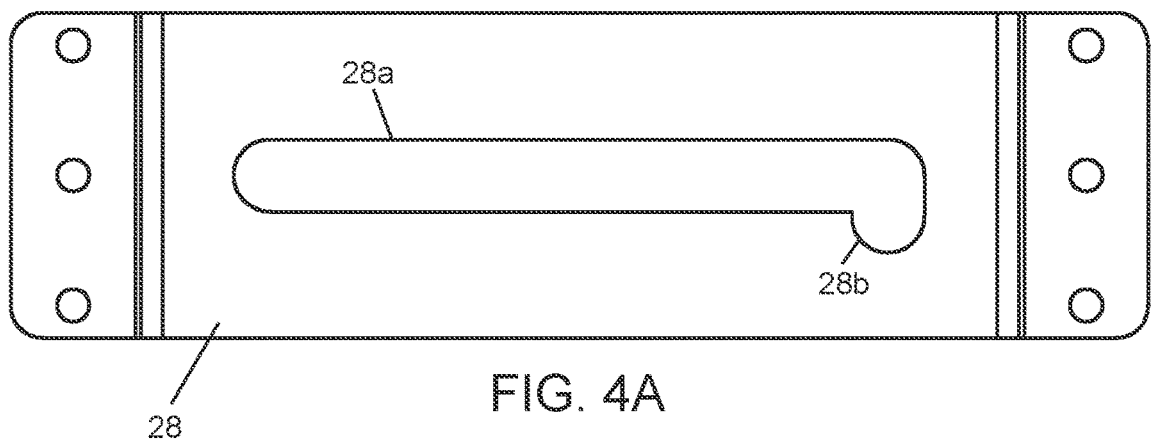
FIG. 4A is an enlarged view of a slotted bracket for supporting a back frame of the furniture system of FIG. 1.

As shown in the illustrated embodiments of FIGS. 3A-3G, as the convertible furniture system 10 is deploying to the bed configuration 26, the guide pins 34 slide along the inside of the slide slots 28a to allow a user to maneuver the system 10 as necessary to position the system 10 into the bed configuration 26. The same applies when a user is maneuvering the convertible furniture system 10 from the bed configuration 26 to the bench configuration 24. Each slide slot 28a includes a retaining pin stop, index, or rest 28b defined by a notch cutout of the slotted bracket 28 and disposed at a rear portion of the slide slot 28a (FIG. 4A). The pin stop 28b receives the respective guide pin 34 when the guide pin is in the fully back position inside of the slide slot 28a, such that the pin stop 28b retains the guide pin 34 to prevent the guide pin 34 from freely sliding along the slide slot 28a when the furniture system is to remain static in the bench configuration 24. A pair of bench back stop blocks or rest supports 36 (FIG. 4) are disposed on a portion of a back wall 12b of the living space 12 to space the lower back portion of the furniture system 10 away from the back wall 12b to retain a desired angle for the bench back frame 22 and thereby provide a comfortable seating position for a user.

The bed center support brackets 30 are fixed to a portion of each respective sidewall 12a to support a center portion of the side ends of the convertible furniture system 10 when the system 10 is in the bed configuration 26 (FIGS. 1-2 and 3G). Each center bracket 30 is configured such that as the system 10 is maneuvering between the bench 24 and bed 26 configurations, the back frame 22 and the bottom frame 20 cannot contact or hit the center bracket 30. The distance that the center brackets 30 extend inwardly from the sidewall 12a allows the frame assembly 14 to freely pass the center brackets 30 to raise above and drop below the center brackets 30 as necessary during maneuvering of the system 10.

A selectively operable engagement element is provided in the form of a pair of slideably extendable support hooks 38 which are disposed at opposite side ends of the furniture system 10, on a lower back portion of the back frame 22 (FIGS. 4, 5, and 5A). Each support hook 38 is selectively slideable from a passive position wherein the hook 38 is not able to interact with the center support bracket 30 and an extended or hooking position where a hook portion or tab 44 of the hook 38 is insertable into the center support bracket 30 to vertically support a center, side end portion of the system 10 in the bed configuration 26 (FIGS. 4-5A). As best illustrated in FIG. 5A, each slideable hook 38 is slideably coupled to the lower or distal portion of the back of the back frame 22 with mechanical fasteners 40. The mechanical fasteners are disposed through slots 42 in the hook 38. The mechanical fasteners 40 secure the hook 38 to the back frame 22 while allowing the hook 38 to selectively slide back and forth from the passive position to the hooking position relative to the fasteners 40. The hook 38 includes the hook portion or tab 44 at the distal end of the hook 38 and the hook 44 is insertable into an upper portion of the center support bracket 30 to secure the hook 38 to the bracket 30. The hook 38 is vertically supported by the center support bracket 30 when the hook 44 is inserted into center support bracket 30 so that the hook 38 vertically supports the center of the side end of the frame assembly 14 when the system 10 is static in the bed configuration 26.

Figure 8:
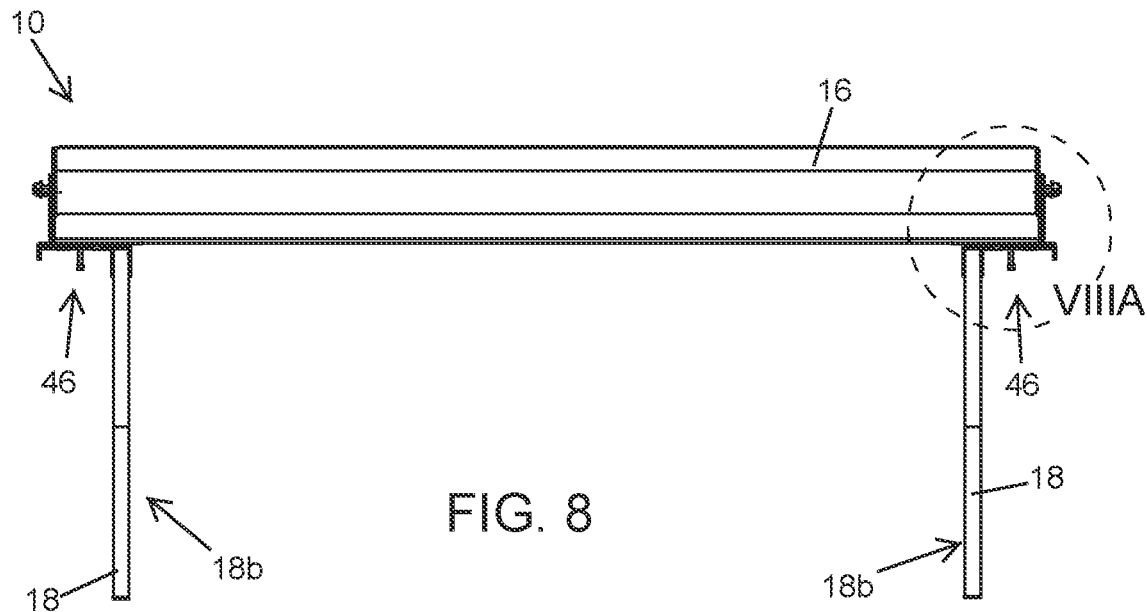
FIG. 8 is a front elevation view of the convertible furniture system of FIG. 2.
Figure 8A:
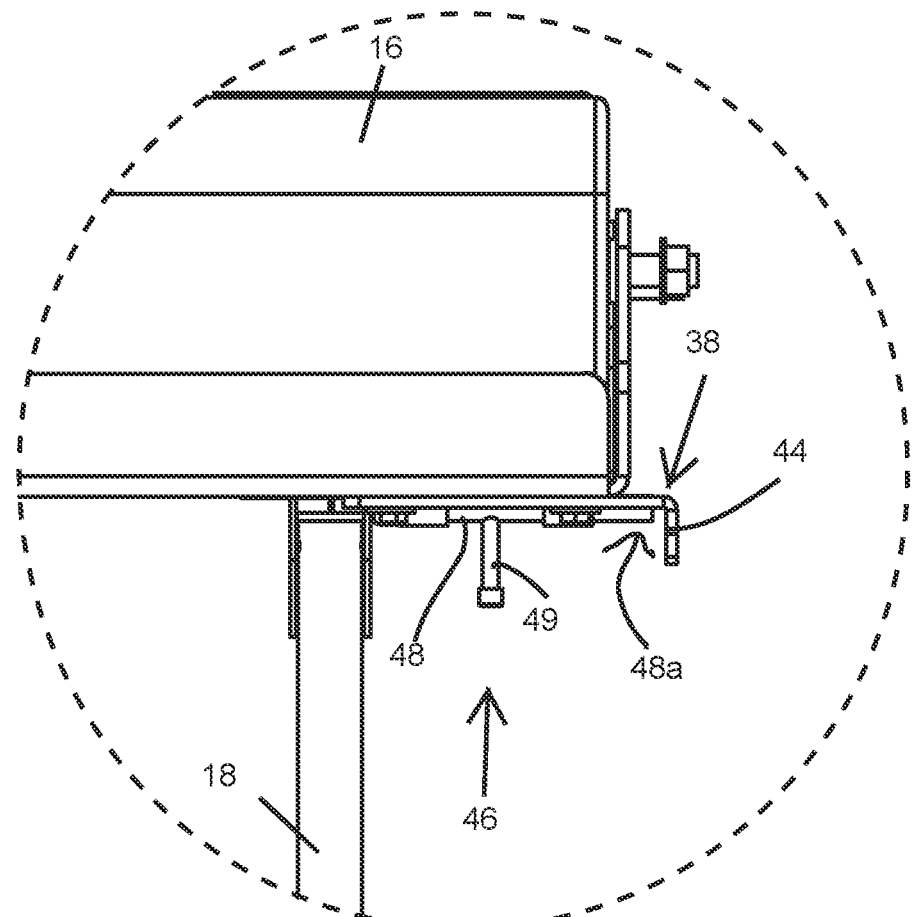
FIG. 8A is an enlarged view of the region designated VIIIA in FIG. 8.

The bed end support brackets 32 are fixed to a portion of each respective sidewall 12a to support the end portions of the convertible furniture system 10 when the system 10 is in the bed configuration 26 (FIGS. 1-2 and 3G). Each bed end support bracket 32 includes a pin-hole 32a disposed in the bracket 32 (FIG. 4). A selectively operable engagement element, in the form of a latch pin assembly 46, is disposed at opposite side ends of the furniture system 10, on a forward or distal portion of the bottom of the bottom frame 20 (FIGS. 8 and 8A). When the convertible furniture system 10 is in the substantially horizontal bed configuration 26, the latch pin assemblies 46 are located adjacent to the respective bed end support brackets 32. Each latch pin assembly 46 includes a slideable pin 48 with a handle 49. The slideable pin 48 is selectively slideable between a passive position wherein the pin 48 is not able to interact with the respective bed end support bracket 32 and an extended or latching position in which a distal end portion 48a of the pin 48 is insertable into the pin-hole 32a to vertically support the forward end of the furniture system 10 in the bed configuration 26 (FIG. 2). The pin-hole 32a is positioned and sized to receive the distal end 48a of the latch pin 48 in the extended position. The latch pin 48 is vertically supported by the bed end support bracket 32 when the latch pin distal end 48a is inserted into bed end support bracket 32 so that the latch assembly 46 vertically supports the forward portion of the frame assembly 14 when the system 10 is static in the bed configuration 26.

In the illustrated embodiment of FIGS. 1-8A, the extendable support legs 18 are coupled to a leg bracket 50 that is disposed at or near a forward or distal edge of the bottom portion of the bottom frame 20. The extendable legs 18 are substantially perpendicular to the bottom frame 20. The extendable legs 18 are telescopically extendable between a bench length 18a where the legs 18 are sized to support the bottom frame 20 in the bench configuration 24 (FIGS. 1, 3A, 4, 5, and 6) and a bed length 18b where the legs 18 are sized to support the bottom frame 20 in the bed configuration 26 (FIGS. 2, 3G, and 7-8).

As best illustrated in FIGS. 3A-3G, the convertible furniture system 10 is maneuverable between the bench configuration 24 shown in FIG. 3A and the bed configuration 26 shown in FIG. 3G, with user input forces or maneuvers illustrated in phantom. From the bench configuration 24, a user can pull the bottom frame 20 forward away from the back wall 12b which causes the back frame 22 to pivot about the guide pins 34 that are disposed in the respective slotted brackets 28, with the lower portion of the back frame 22 moving away from the back wall 12b and thereby causing the rear or proximal edge of the bottom frame 20 to raise upward away from the floor surface (FIG. 3B). The user can then lift upward on the bottom frame 20 while continuing to pull forward, causing the bottom frame 20 to raise further and the back frame 22 to approach a horizontal orientation (FIG. 3C). The user continues to pull forward and upward on the bottom frame 20 until the bottom frame 20 and back frame 22 have both risen above and cleared the bed center support brackets 30 and bed end support brackets 32, with the back frame 22 being slightly above a horizontal orientation (FIG. 3D).

Once the bottom frame 20 and back frame 22 have cleared above the support brackets 30, 32, the user can push the bottom frame 20 backward causing the back frame 22 to return to a horizontal positon and the user can position the furniture system 10 laterally relative to the guide pins 34 and slotted brackets 28 to position and insert the slidable support hooks 38 into respective bed center support brackets 30 to support the back frame 22 in the generally horizontal orientation (FIG. 3E). The user can then push down on the bottom frame 20 or allow gravity to urge the bottom frame 20 downward toward a horizontal orientation (FIG. 3F). The user can locate the slideable pins 48 into respective bed end support brackets 32 to support the back frame 22 in the generally horizontal orientation (FIG. 3G), at which point the furniture system 10 is in the bed configuration 26. These steps can be reversed in order to deploy the furniture system 10 from the bed configuration 26 to the bench configuration 24.

In the illustrated embodiment of FIGS. 9-12, a multi-leg convertible furniture system 10a is configured similarly and functions in similar fashion to convertible furniture system 10 described above, and includes many identical or substantially similar components, with significant differences discussed hereinafter. The multi-leg system 10a includes bench supports, the form of a pair of pivotably extendable bench support legs 52 that are each coupled to a corresponding leg bracket 54 disposed at a forward, bottom portion of the bottom frame 20, and bed supports, in the form of a pair of pivotably extendable bed support legs 56 that are each coupled to a corresponding leg bracket 54 disposed at a forward, bottom portion of the bottom frame 20 and spaced apart from the extendable bench support legs 52. The bench support legs 52 are pivotably extendable between a bench leg extended configuration 52a where the legs 52 are substantially perpendicular to the bottom frame 20 to support the bottom frame 20 in the bench configuration 24 (FIGS. 9-10) and a bench leg stowed configuration 52b where the legs 52 are substantially parallel to the bottom frame 20 (FIGS. 11-12). The extendable bed support legs 56 are pivotably extendable between a bed leg extended configuration 56a where the legs 56 are substantially perpendicular to the bottom frame 20 to support the bottom frame 20 in the bed configuration 26 (FIGS. 11-12), and a bed leg stowed configuration 56b where the legs 56 are substantially parallel to the bottom frame 20 (FIGS. 9-10). The extendable bed support legs 56 may support the bottom frame 20 in the beg configuration 26 either on their own, or may cooperate with a pair of selectively engageable bed end support brackets, such as brackets 32 of system 10, which are configured to receive selectively operable engagement elements, such as the latch pin assemblies 46.

Figure 13:
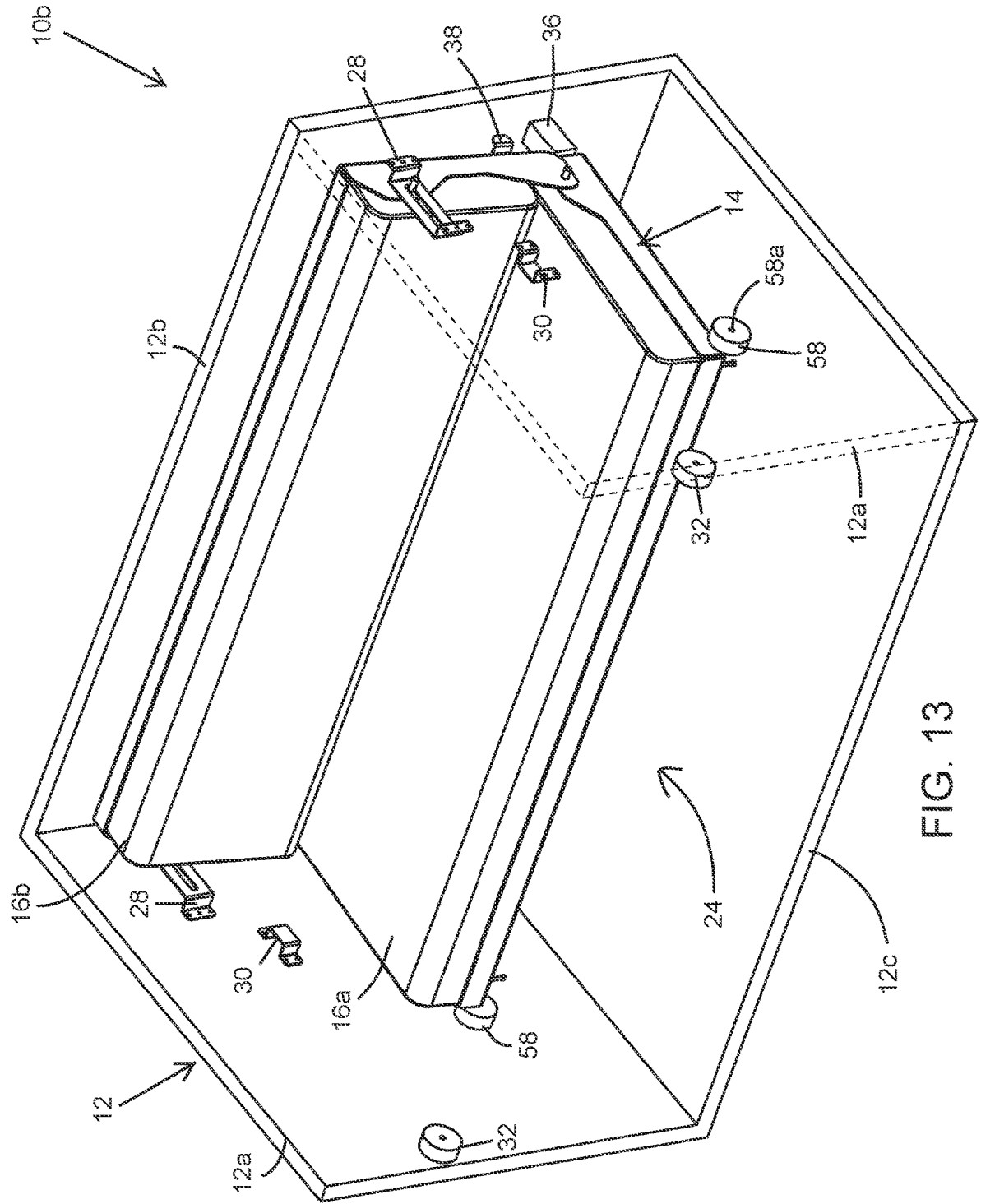
FIG. 13 is a front-side perspective view of another convertible furniture system in accordance with the present invention, depicted in a bench configuration.
Figure 14:
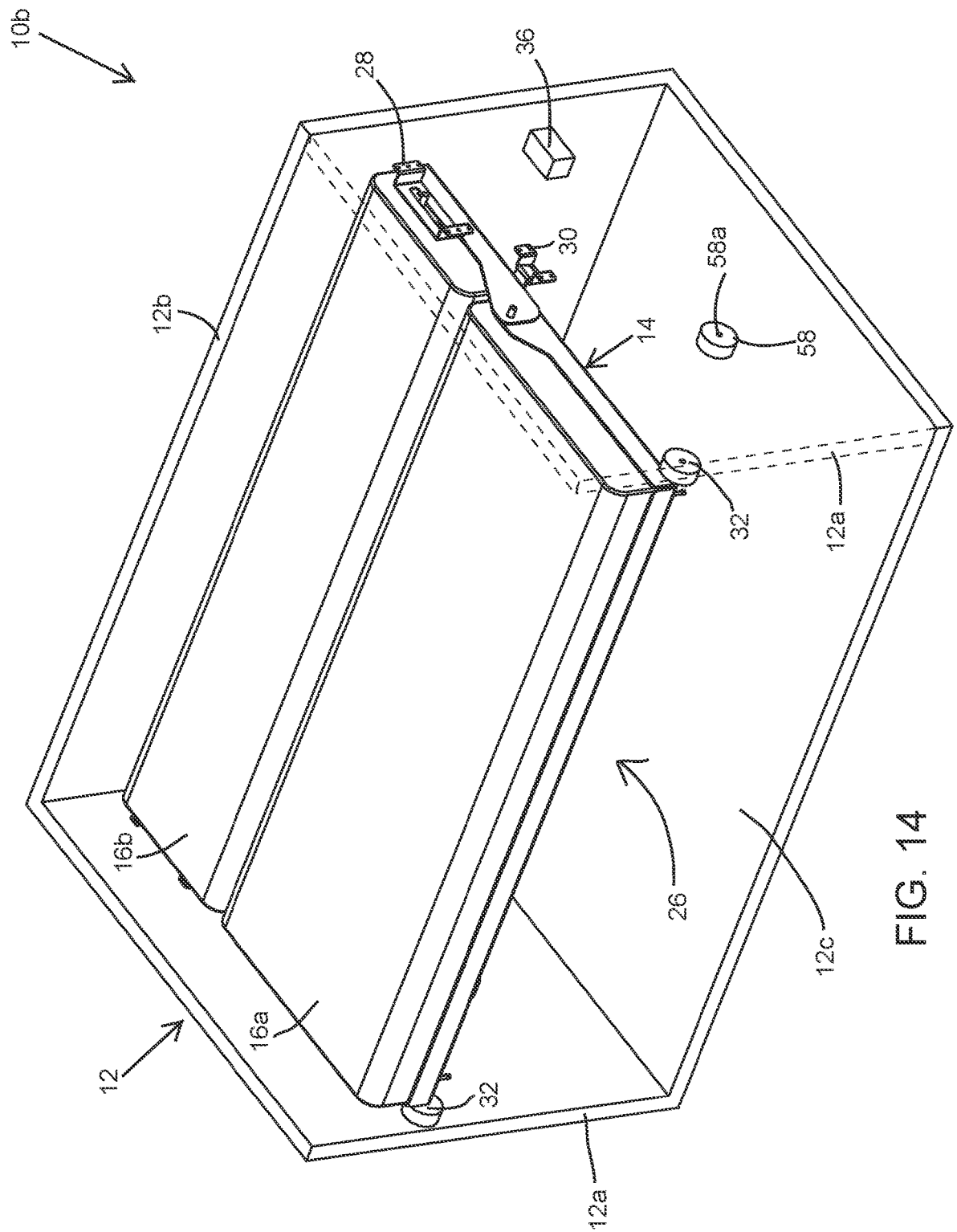
FIG. 14 is a front-side perspective view of the convertible furniture system of FIG. 13, depicted in a flat, bed configuration.

In the illustrated embodiment of FIGS. 13-14, a legless convertible furniture system 10b is configured similarly and functions in similar fashion to the convertible furniture system 10 and the multi-leg convertible furniture system 10a described above, and includes many identical or substantially similar components, with significant differences discussed hereinafter. The legless system 10b is configured to mount to the living space 12 without support from extendable legs. Legless convertible furniture system 10b includes a selectively engageable bench support, in the form of a bottom frame end support bracket 58, that is fixed to a portion of each sidewall 12a to support a forward end portion of the convertible furniture system 10b when the system 10b is in the bench configuration 24 (FIG. 13). The bottom frame end support brackets 58 of FIGS. 13 and 14 are substantially identical to the bed end support brackets 32 described previously, and each includes a pin-hole 58a disposed in the bracket 58 (FIGS. 13-14). The pin-holes 58a are positioned and sized to receive the distal ends 48a of the respective latch pins 48 when the pins 48 are in the extended latch position. The latch pins 48 are vertically supported by the bottom frame end support brackets 58 when the latch pins' distal ends 48a are inserted into corresponding bottom frame end support brackets 58 so that the latch assembly 46 vertically supports the forward portion of the frame assembly 14 in the bench configuration 24. While the bottom frame 20 of the legless convertible furniture system 10b is supported without legs, it will be appreciated that extendable or fixed legs may be provided in addition to the bottom frame end support brackets 58 to further support the bottom frame 20 in the bench configuration 24.

Figure 19:
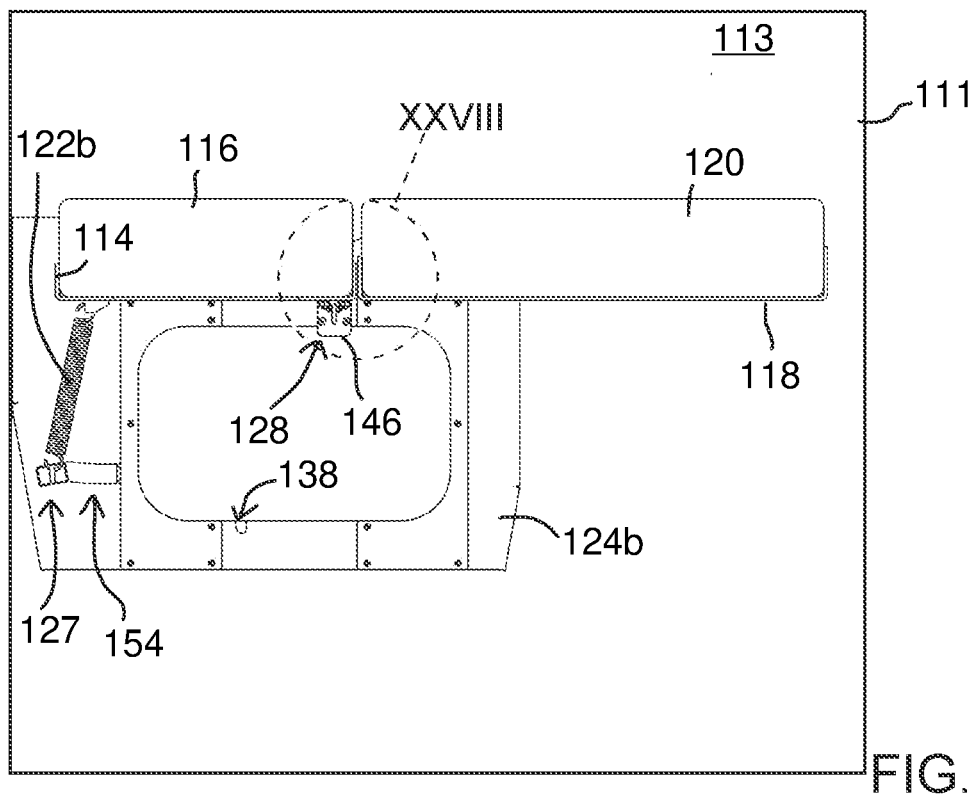
FIG. 19 is a sectional side elevation view of the convertible furniture system taken along Line XIX-XIX of FIG. 18.
Figure 20:
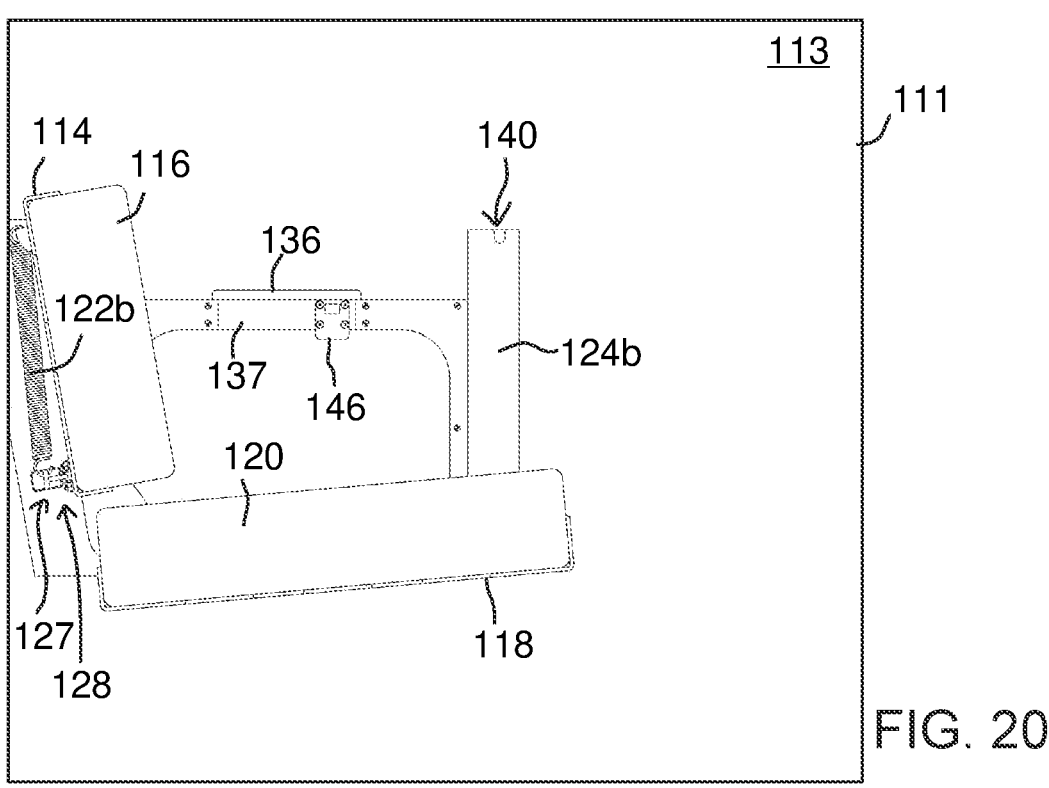
FIG. 20 is a sectional side elevation view of the convertible furniture system taken along Line XX-XX of FIG. 15.

Referring to the illustrative embodiment of FIGS. 15-28, a legless, spring-assisted convertible furniture system 110 for a living quarter 111 (FIGS. 18-20) is configured similarly and functions in similar fashion to convertible furniture systems 10, 10a, and 10b as described above and illustrated in respective FIGS. 1-14. The spring-assisted system 110 includes many identical or substantially similar components as compared to convertible furniture systems 10, 10a, and 10b, with significant differences discussed below. The spring-assisted system 110 includes a convertible frame assembly 112 that includes a backrest body or bench back frame 114 for supporting a back cushion 116 and a seat frame or body or bench bottom 118 for supporting a seat cushion 120. The bench bottom 118 is pivotably coupled at or near its rearward or proximal portion or edge to the lower or distal portion or edge of the backrest 114 at a hinge or pivot pin 121 (FIGS. 17C, 17E and 26), when viewed with the frame assembly 112 in a bench configuration as illustrated in FIGS. 15-17A, in which the backrest 114 is generally upright relative to upright walls of the living quarter. The bench bottom 118 and the backrest 114 coordinate to define a bed in a bed configuration as illustrated in FIGS. 17E-19, in which the bench bottom 118 and the backrest 114 are flat and generally parallel to each other as well as generally horizontal. Accordingly, in the bed configuration of FIGS. 17E-19, the bench bottom 118 occupies a position that is superjacent to the position it occupies when in the bench configuration of FIGS. 15-17A. FIG. 20 illustrates the lower position of the bench bottom 118 in the bench configuration and FIG. 19 illustrates the higher position of the bench bottom 118 in the bed configuration. In the illustrated embodiment, when the frame assembly 112 is in the bed configuration (FIGS. 17E-19), the bench bottom 118 and backrest 114 are each elevated to a height that is equal to or about the same as the height of the upper or proximal portion of the backrest 114 when the system 110 is in the bench configuration (FIGS. 15-17A and 20).

Figure 15:
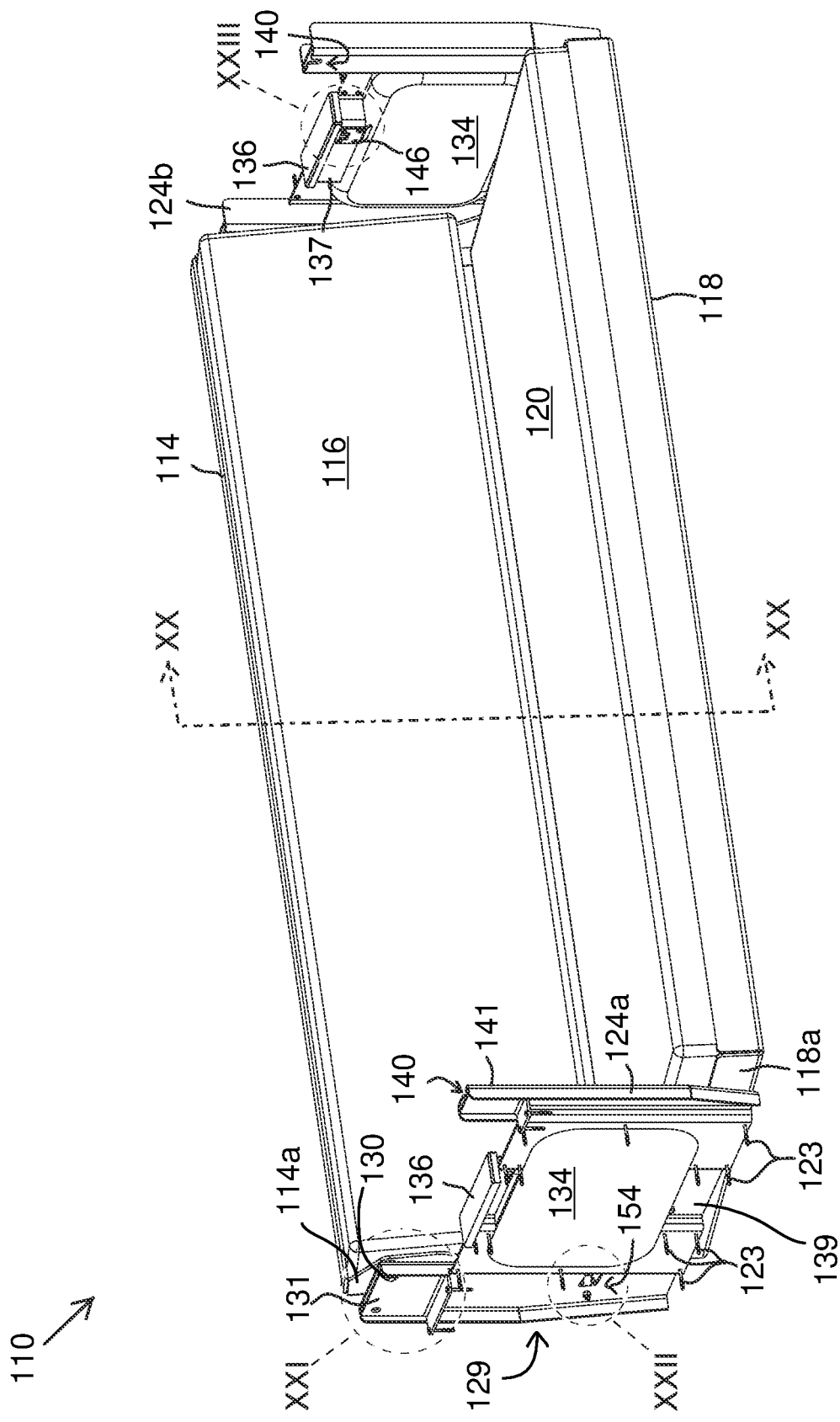
FIG. 15 is a front perspective view of another convertible furniture system in accordance with the present invention, depicted in a bench configuration.

The spring-assisted system 110 includes a conversion assist mechanism or actuator in the form of a pair of coiled tension springs 122a,122b (FIGS. 16 and 18-20), and a frame assembly support system in the form of a pair of generally rectangular wall support frames 124a, 124b provided at each side of the frame assembly 112 (FIGS. 15-18). Each wall support frame 124a, 124b is mounted via a mounting surface 129 to an upright wall 113 of the living quarter 111, such as with a plurality of screw fasteners 123 (FIG. 15). Each wall support frame 124a, 124b includes one or more regions or portions that extend away from the respective upright wall 113 and toward the frame assembly 112 to provide supports or rests for portions of the frame assembly 112 and/or the user of the system 110, as will be described in further detail below.

It is contemplated that the wall support frames 124a, 124b may each include a removable and/or repositionable cover frame and a stationary wall-mountable frame at which the cover frame may be selectively hung or mounted onto the stationary frame. For example, if a user desires to remove the frame assembly 112 of the system 110 to make additional space available in the living quarter 111, the user may remove the frame assembly 112 and the cover frames of the wall support frames 124a, 124b while the corresponding stationary frames remain attached to the upright walls 113 at the mounting surfaces 129. The user may replace the frame assembly 112 and the cover frames if they desire to re-install the furniture system 110. While the frame assembly 112 is described herein as removable from the upright walls 113 of the living space 111, it will be appreciated that the upright side walls may form an integral portion of the furniture system 110. As such, the upright side walls may be attached to a structure within the vehicle living space 111. For example, the upright side walls may be bolted, welded, or otherwise fastened to a floor of the vehicle living space 111.

Figure 16:
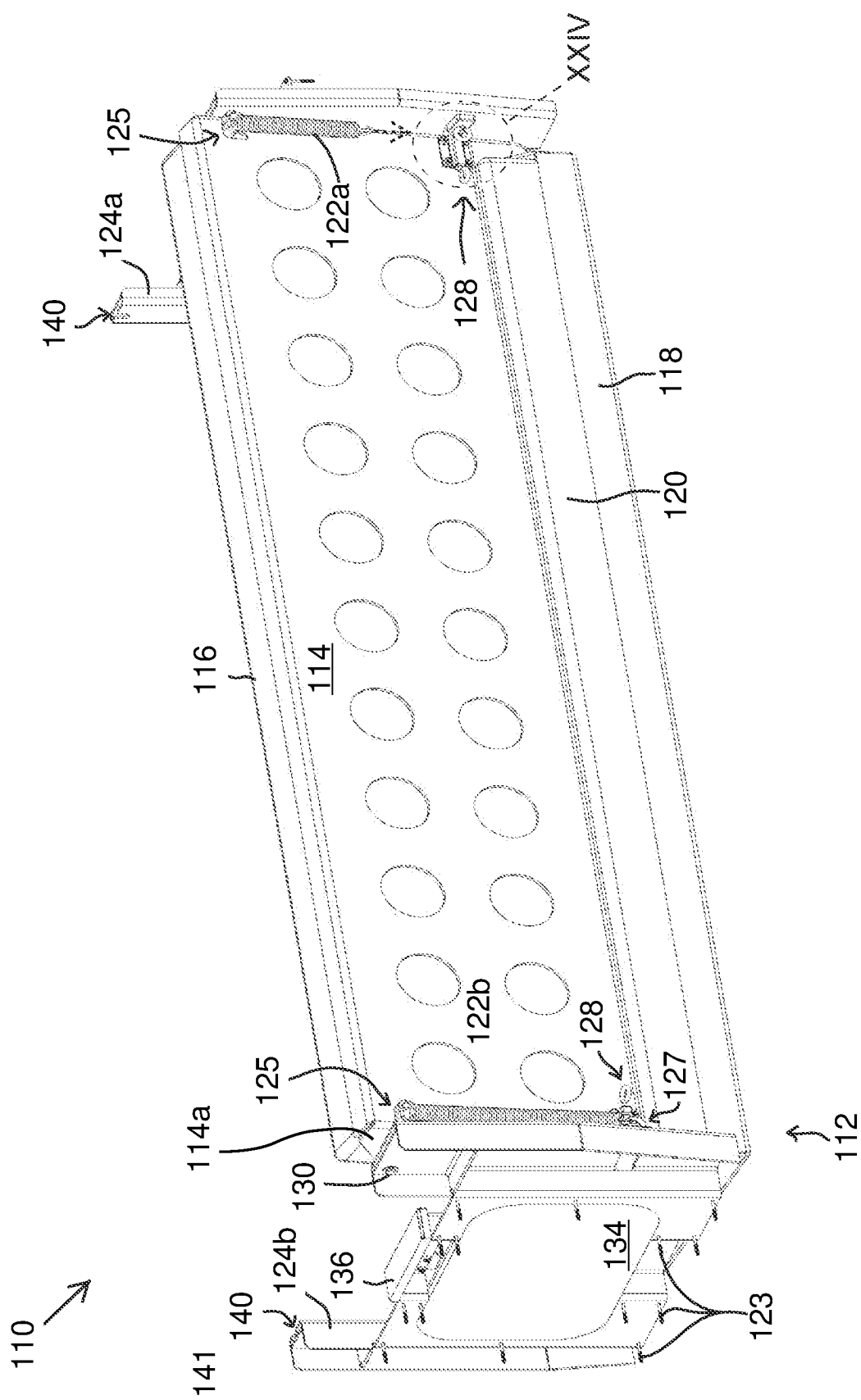
FIG. 16 is a rear perspective view of the convertible furniture system of FIG. 15.
Figure 18:
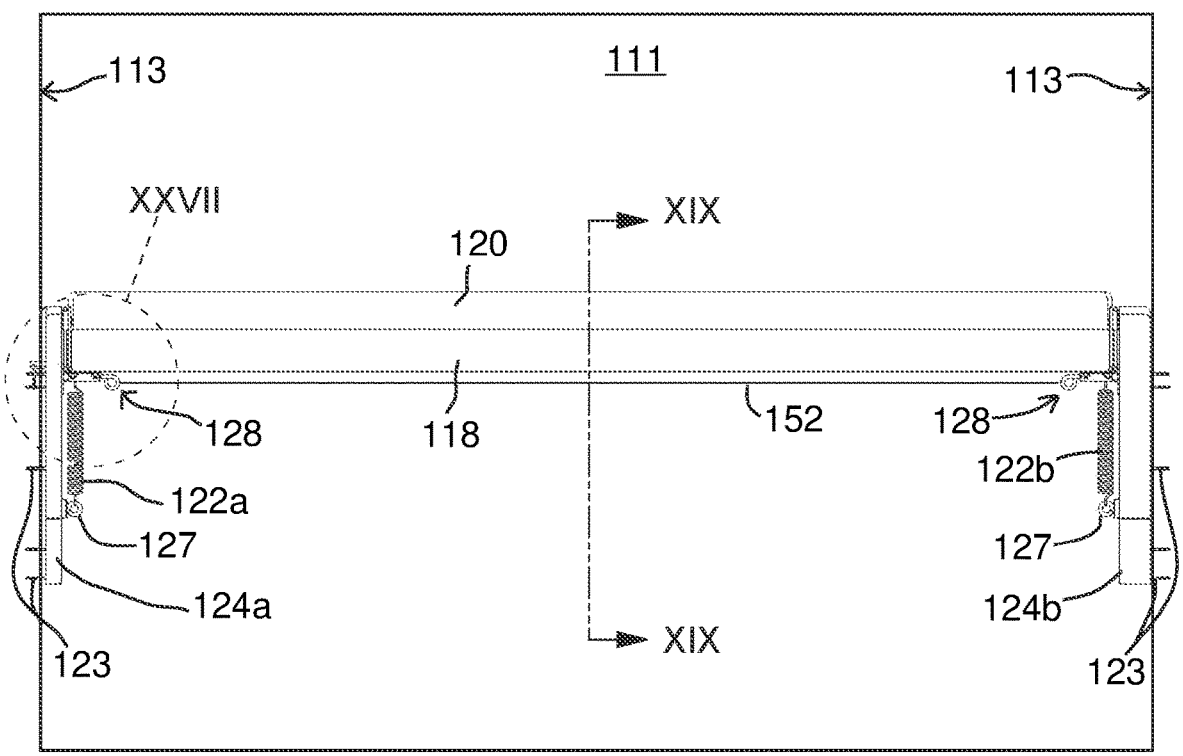
FIG. 18 is a front elevation view of the convertible furniture system of FIG. 17E.
Figure 21:
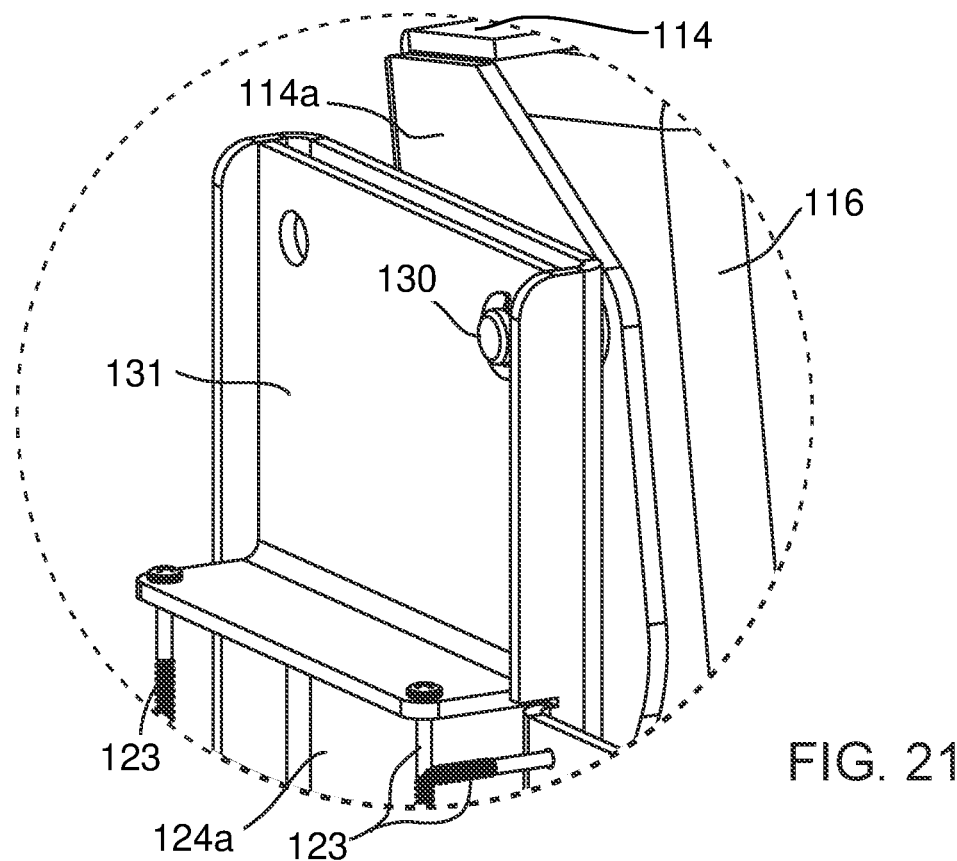
FIG. 21 is an enlarged view of the region designated XXI in FIG. 15.

Each spring 122a, 122b has one end coupled to a backrest attachment point 125 at a respective side end of the rear portion of the backrest 114, and an opposite end coupled to an eyelet or wall support frame attachment point 127 at a corresponding one of the wall support frames 124a, 124b (FIGS. 16 and 18). The spring 122a is depicted in FIG. 16 with one end coupled to the backrest 114 and the opposite end freely suspended and not connected to its corresponding eyelet 127, while spring 122b is shown connected to the backrest 114 and its corresponding eyelet 127. This illustration is provided to show structure of a latch 128, which will be described in further detail below. A backrest support pin 130 is coupled to each side end of the backrest 114 at an upper or proximal portion of a respective side end stiffener 114a of the backrest 114 (FIGS. 15-16 and 21). Each backrest support pin 130 is pivotably coupled to a backrest or back frame support, in the form of an inwardly extended, upper-rear portion or upright extension 131 of the respective wall support frame 124a, 124b (FIG. 21). The backrest 114 is therefore pivotable about the backrest support pins 130 relative to the wall support frames 124a, 124b.

Figure 17A:
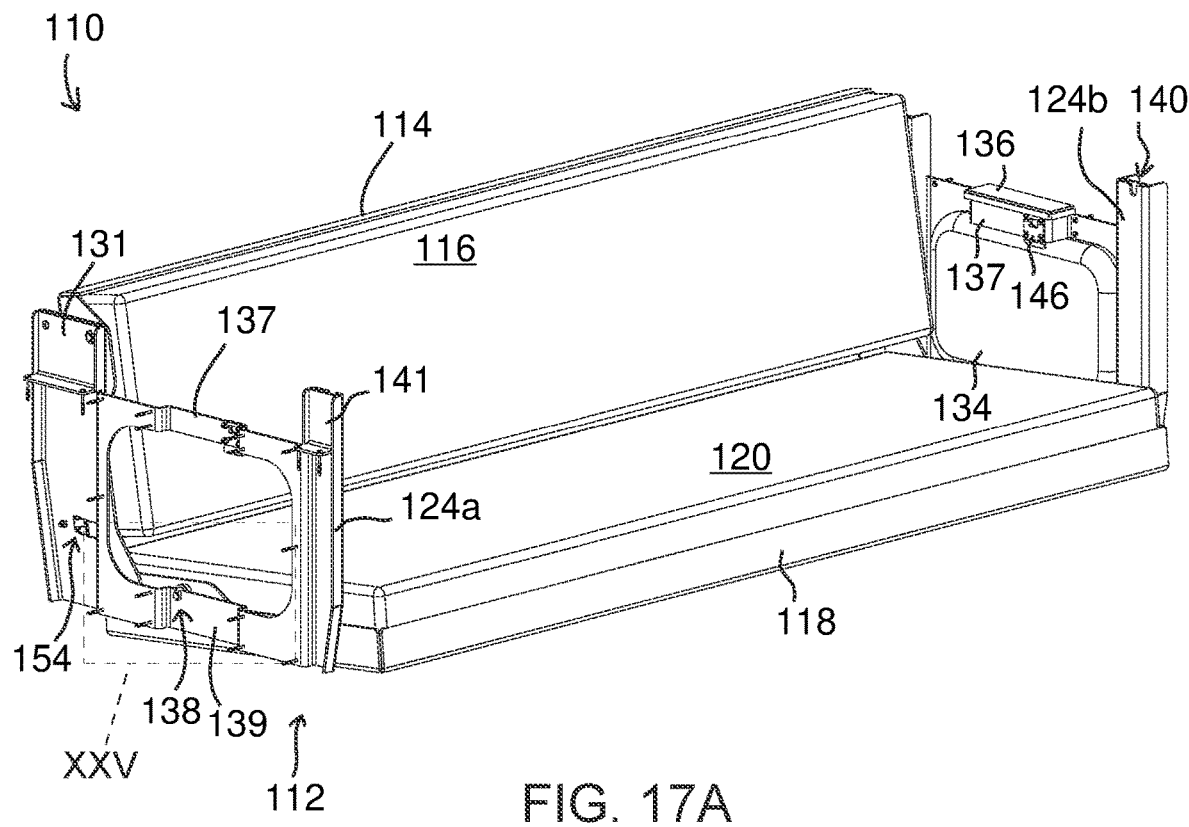
FIGS. 17A-17E are front perspective views of the convertible furniture system of FIG. 15, depicting sequential steps of deploying the convertible furniture system from the bench configuration to a flat, bed configuration, with some aesthetic panels and cushions omitted to show obscured structure.
Figure 17B:
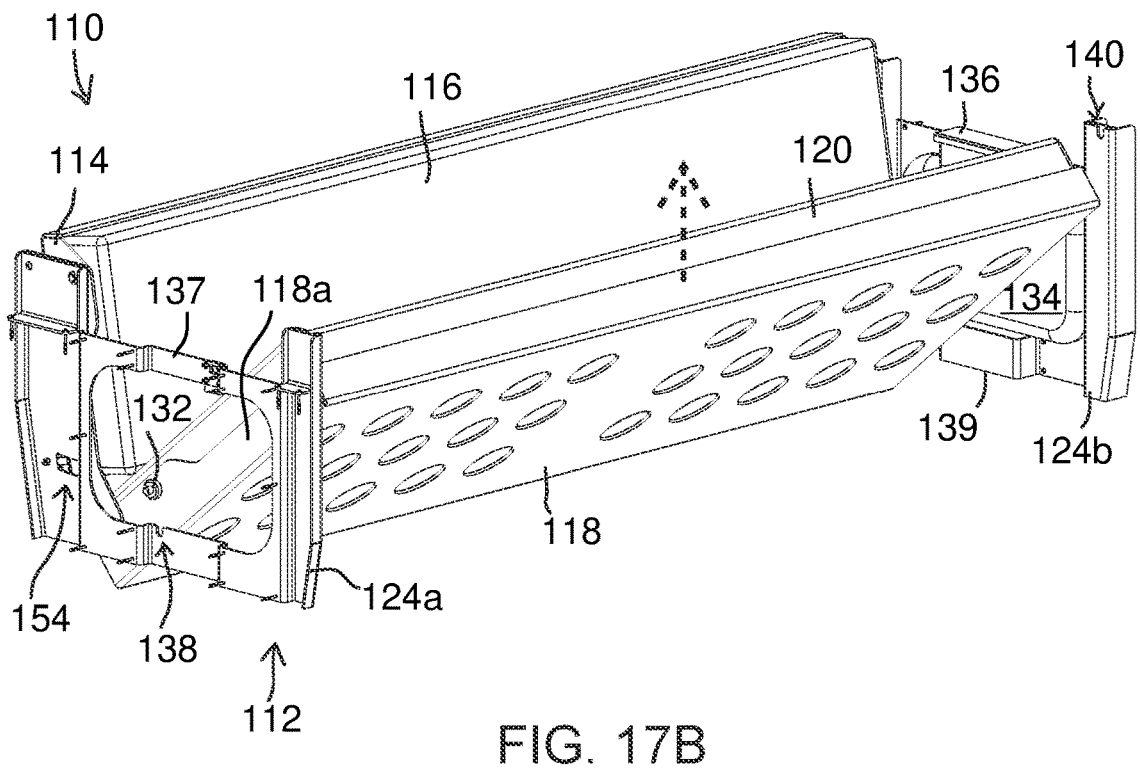
Figure 17C:
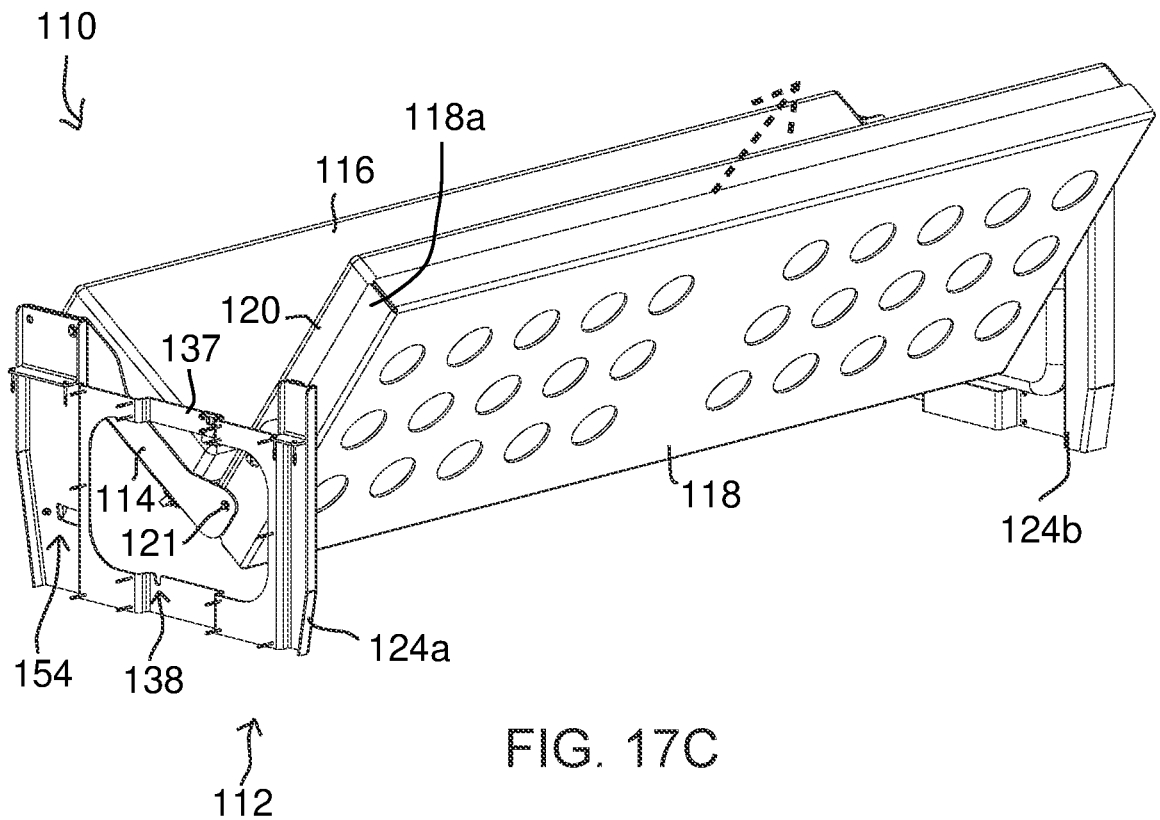
Figure 17D:
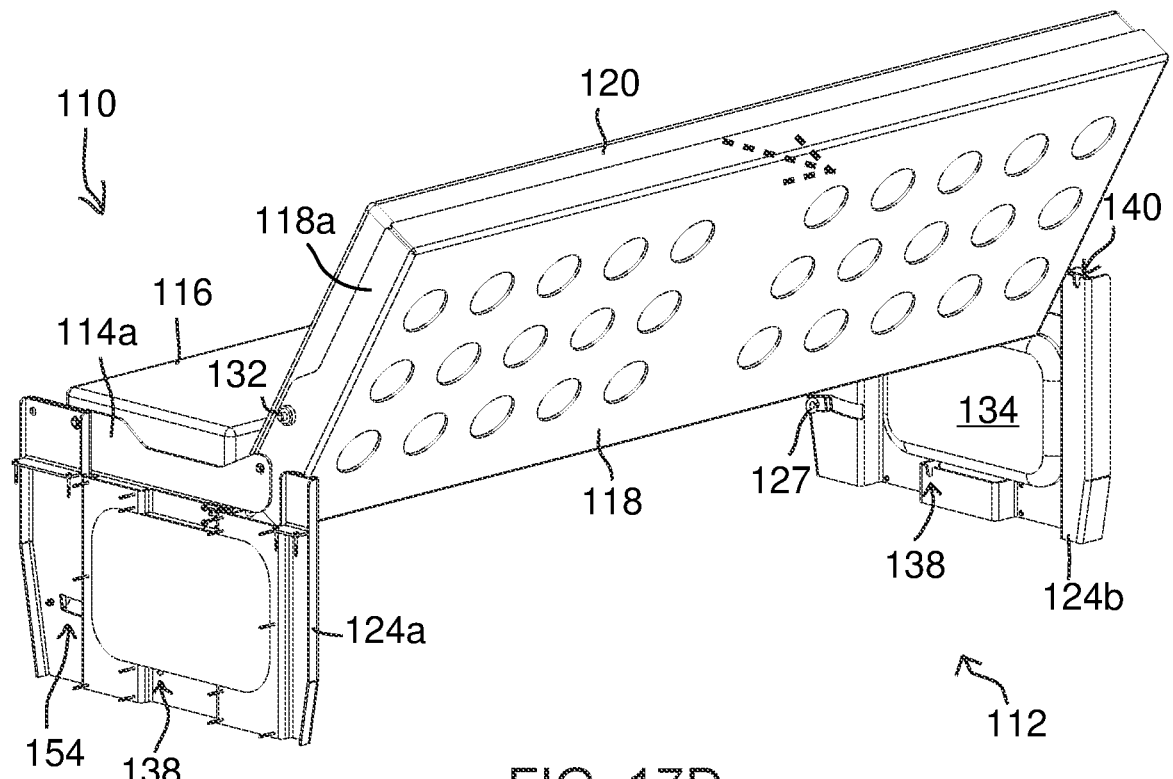
Figure 17E:
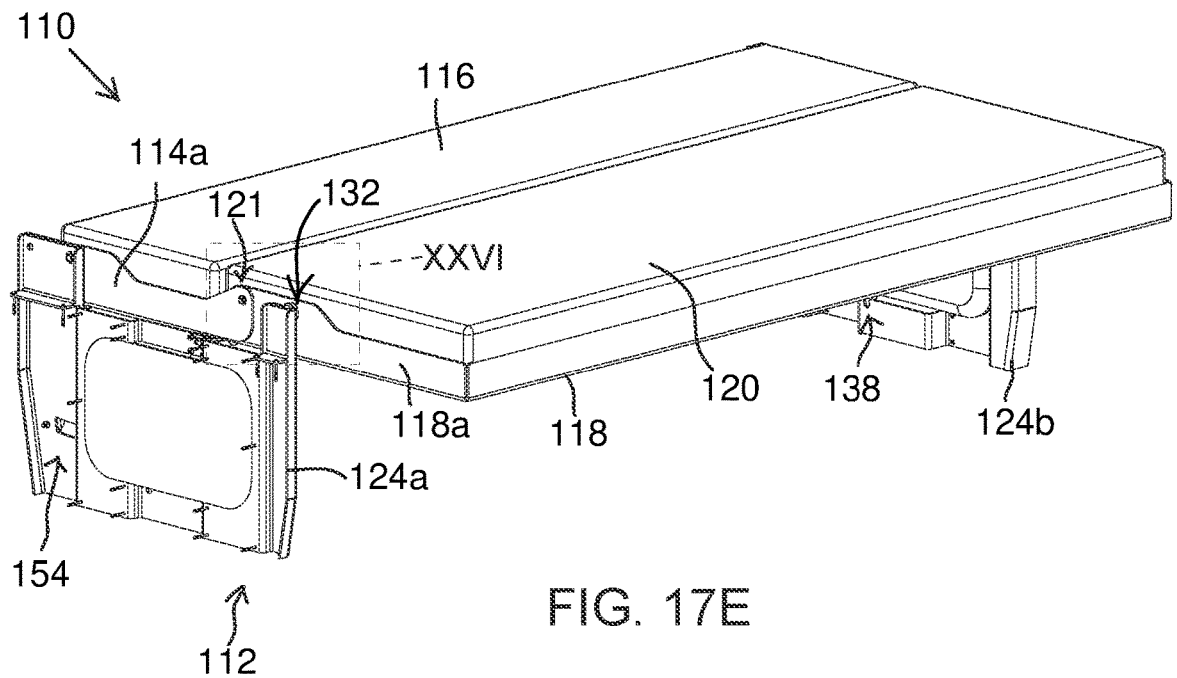

A bench bottom support pin 132 is fixedly coupled to each stiffener 118a at the side ends of a middle portion of the bench bottom 118 (FIGS. 17B, 17D, and 17E). The bench bottom support pin 132 is provided for supporting the bench bottom 118 in a generally horizontal orientation in each of the bench configuration and the bed configuration. Aesthetic covers 134 are provided with each wall support frame 124a, 124b and provide safety protection to prevent a user or articles (e.g. clothing, blankets, etc.) from being caught or pinched between the frame assembly 112 and the wall support frames 124a, 124b (FIGS. 15 and 16). Armrests 136 are provided at inwardly extended, upper-middle portions 137 of the respective wall support frames 124a, 124b (FIGS. 15, 17A, 20, and 23). The aesthetic cover 134 and armrest 136 are omitted from the wall support frame 124a in the illustrations of FIGS. 17A-17E to show underlying structure.

Figure 25:
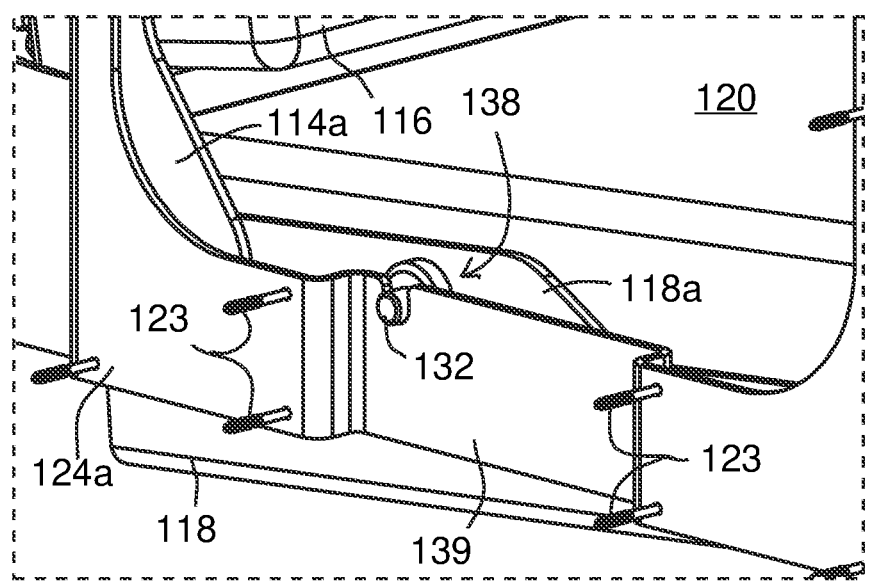
FIG. 25 is an enlarged view of the region designated XXV in FIG. 17A.
Figure 26:
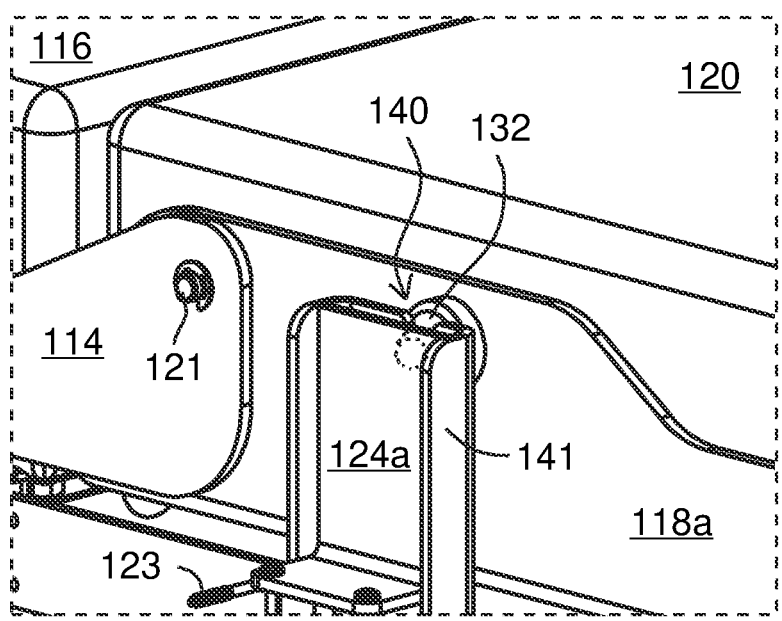
FIG. 26 is an enlarged view of the region designated XXVI in FIG. 17E.

The deployment operation of the spring-assisted system 110 from the bench configuration to the bed configuration is depicted sequentially in FIGS. 17A-17E, with user input forces or maneuvers illustrated using arrows in phantom. Each wall support frame 124a, 124b includes a set of bench bottom support pin receivers, indices, or rests, including bench supports or brackets and bed supports or brackets. The bench supports include a bench center support or index defined by a lower bench notch 138 that is formed in an inwardly extending, lower-middle portion 139 of the respective support frame 124a, 124b (FIGS. 17A and 25). The bed supports include a flat or bed center support or index defined by an upper bed notch 140 that is formed in an inwardly extending, upper-forward portion or upright extension 141 of the respective support frame 124a, 124b (FIGS. 17E, 26, and 27).

As best shown in FIG. 25, the bench notch 138 receives the bench bottom support pin 132 when the frame assembly 112 is in the bench configuration. The bench notch 138 retains the support pin 132 to prevent the pin 132 from freely moving laterally when the spring-assisted system 110 is to remain static in the bench configuration. As best shown in FIG. 26, the bed notch 140 receives the bench bottom support pin 132 when the frame assembly 112 is in the flat bed configuration. The bed notch 140 retains the support pin 132 to prevent the pin 132 from freely moving laterally when the spring-assisted system 110 is to remain static in the bed configuration. The bench notches 138 and the bed notches 140 are provided at portions of the respective wall support frames 124a, 124b that extend or protrude inwardly and away from the upright wall 113 (i.e. toward the frame assembly 112).

As illustrated in FIG. 17C, the portions of the wall support frames 124a, 124b having the bench notches 138 and bed notches 140 are positioned and dimensioned such that when the system 110 is maneuvering between the bench and bed configurations, the backrest 114, the bench bottom 118, and the bench bottom support pins 132 may be moved without contacting or hitting the wall support frames 124a, 124b. In other words, the distance that the wall support frames 124a, 124b extend inwardly from the upright sidewalls 113 allows the frame assembly 112 to freely pass the wall support frames 124a, 124b to raise above and drop below the portion of the wall support frames 124a, 124b having the upper bed notch 140, as necessary during maneuvering of the system 110.

Figure 22:
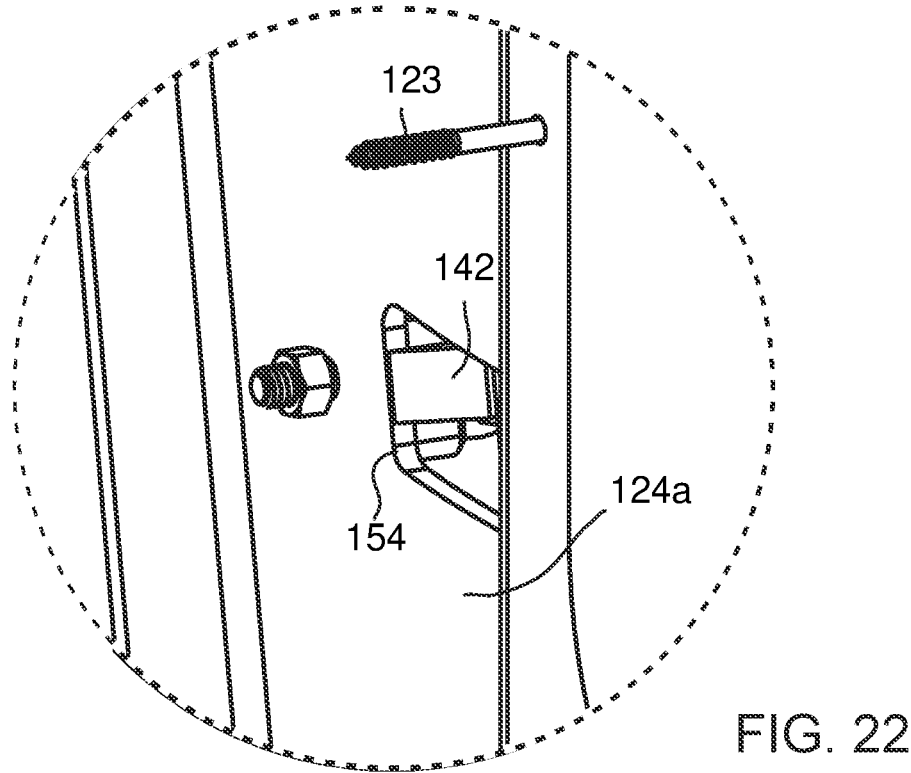
FIG. 22 is an enlarged view of the region designated XXII in FIG. 15.
Figure 23:
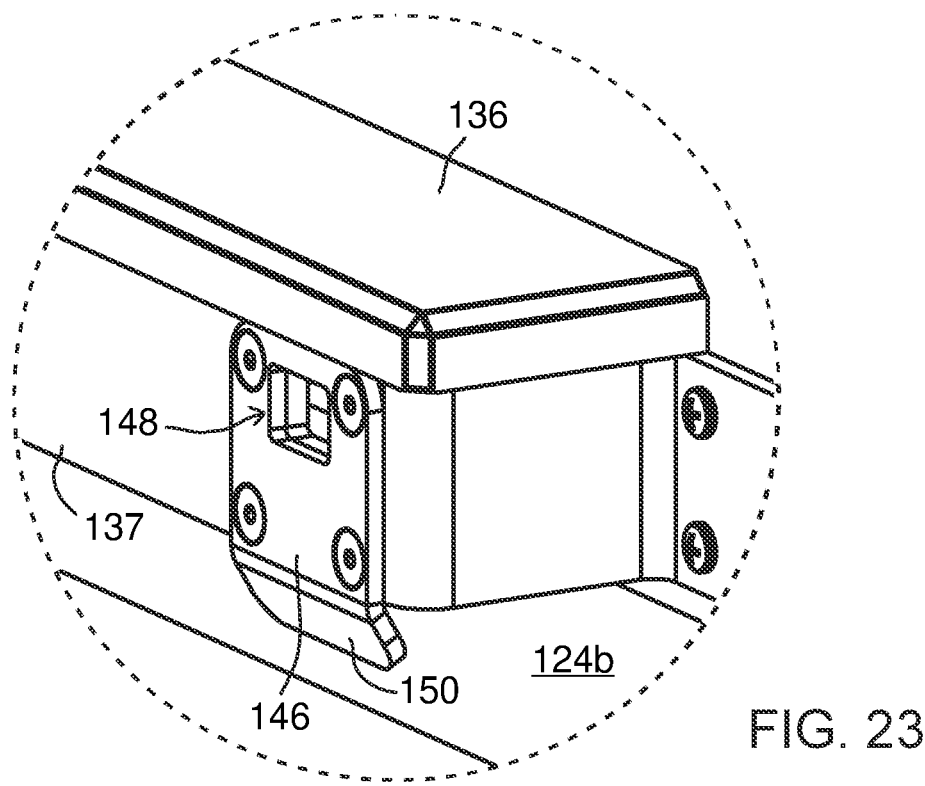
FIG. 23 is an enlarged view of the region designated XXIII in FIG. 15.
Figure 24:
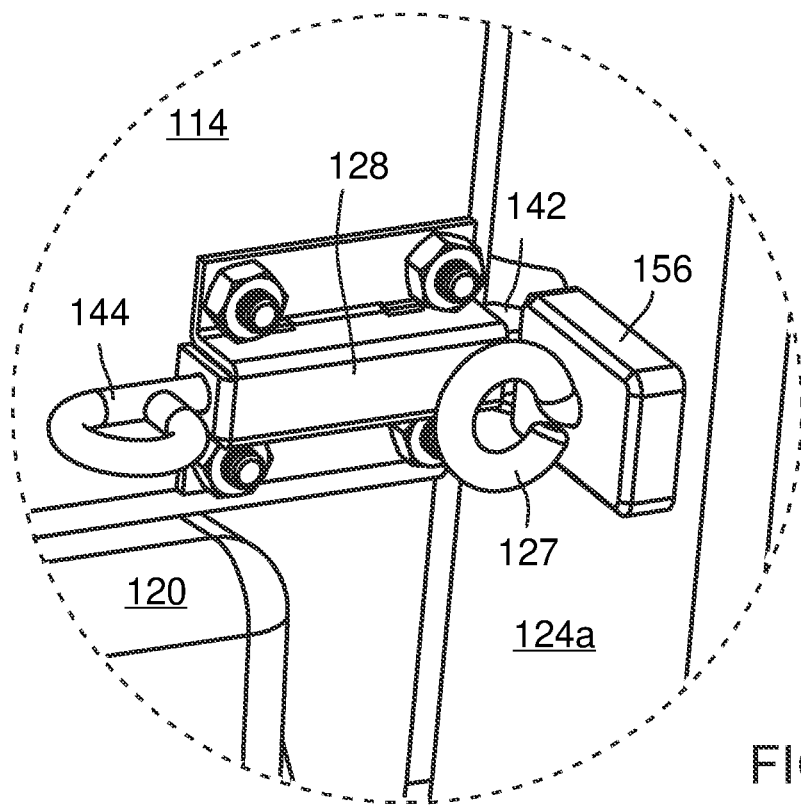
FIG. 24 is an enlarged view of the region designated XXIV in FIG. 16.
Figure 27:
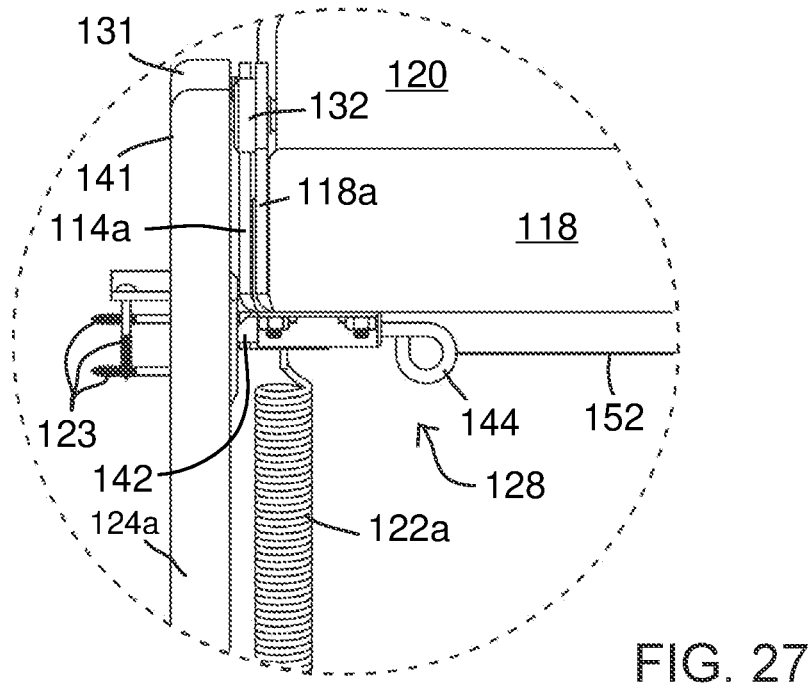
FIG. 27 is an enlarged view of the region designated XXVII in FIG. 18.
Figure 28:
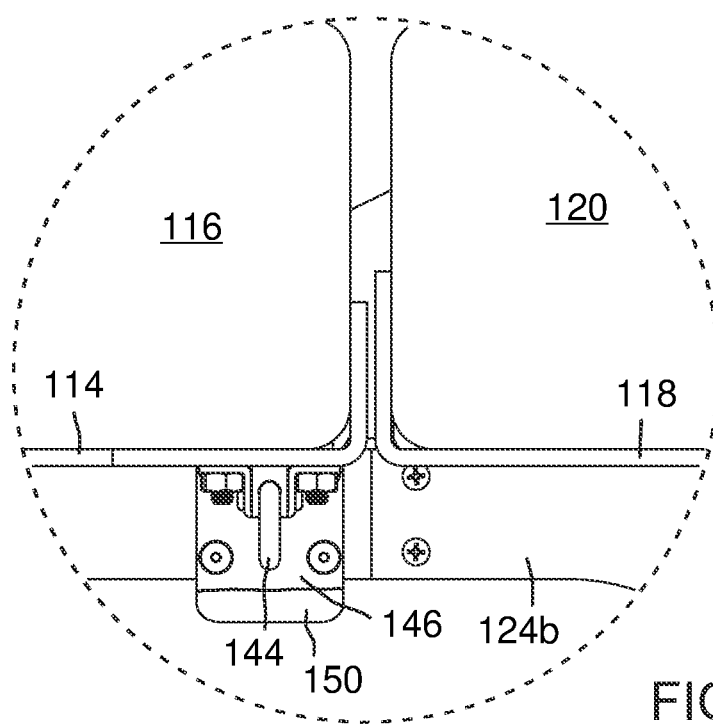
FIG. 28 is an enlarged view of the region designated XXVIII in FIG. 19.

A securing device or lock system, in the form of a pair of slam latches 128, is provided for securing the frame assembly 112 in the bed configuration (FIGS. 19, 27, and 28). The latches 128 are slideably coupled to a lower or distal portion of the back of the backrest 114 (when viewed with the frame assembly 112 in the bench configuration, as illustrated in FIGS. 16 and 24). The latches 128 are preferably spring loaded such that they are continuously biased toward an extended position in which a bolt 142 of the latch 128 is extended beyond the end of the backrest 114 and beyond a portion of the inward face of the adjacent wall support frame 124a or 124b (as best shown in FIG. 22). The latches include a handle 144 for releasing the latch (i.e. sliding the bolt 142 toward a retracted or passive position) to permit the frame assembly 112 to move relative to the wall support frames 124a, 124b between the bench and bed configurations (FIGS. 24 and 27-28). The lock system includes a pair of strike and catch plates 146 proximate the armrests 136 at the extended portion 137 of each wall support frame 124a, 124b (FIGS. 15, 17A, 19, 20, 23, and 28). Each catch plate 146 includes a catch hole 148 (FIG. 23) that is dimensioned to receive the bolt 142 of the latch 128 and is positioned such that when the frame assembly 112 is in the bed configuration, the bolt 142 is insertable in the catch hole 148 (FIGS. 18, 19, 27, and 28). With the bolt 142 extended into the catch hole 148, the bolt 142 and catch hole 148 cooperate to retain the backrest 114 in its bed configuration position, and the bolt 142 at least partially supports the backrest 114 at the corresponding wall support frame 124a or 124b when the system 110 is static in the bed configuration.

The catch plate 146 includes a strike ramp 150 (FIG. 23) to impede the extended bolt 142 when the frame assembly 112 is moving from the bench configuration to the bed configuration. As the extended bolt 142 approaches the catch plate 146, a ramped profile of the bolt 142 first impacts the strike ramp 150. As the ramped profile of the extended bolt 142 progresses along the strike ramp 150 toward the catch hole 148, the bolt 142 is urged toward its retracted position by the strike ramp 150 until the bolt 142 clears the strike ramp 150 and then passes over a flat portion of the catch plate 146 before reaching the catch hole 148. Once the retracted bolt 142 clears the flat portion and is positioned over the catch hole 148, the spring of the latch 128 urges the bolt 142 toward its extended position and the bolt 142 extends into the catch hole 148, as illustrated in FIG. 27. Because the latch 128 is spring loaded, the bolt 142 automatically engages the catch hole 148 when the frame assembly 112 is in the bed configuration. Optionally, and as illustrated in FIGS. 18 and 27, an actuation cable or cord 152 may be provided between the handles 144 of the pair of latches 128. The cable 152 permits a user to actuate the bolts 142 of both latches substantially simultaneously and from a single location remote from the latches 128 (i.e. when standing near the center of the spring-assisted system 110). The cable 152 may be fixed to a portion of the spring-assisted system 110 and/or a location within the living quarter 111 such that when the frame assembly 112 is pivoted or moved in a particular direction or orientation, the cable 152 is automatically pulled, thereby retracting and releasing the bolts 142 of the latches 128.

The securing device or lock system further includes a bench stop, index, or rest, defined by a portion of the wall support frame 124a, 124b at cutout 154, as best shown in FIG. 22. The cutout 154 permits the extended bolt 142 to pass the inwardly extended lower-rear portion of the wall support frame 124a or 124b as the spring-assisted system 110 moves from the bed configuration to the bench configuration. When in the bench configuration, the bolt 142 abuts or rests upon a rear portion of the cutout 154, and thereby supports the backrest 114 in the static bench configuration. A pair of backrest stop blocks or rest supports 156 (FIG. 24) are disposed on the inwardly extended rear portion of each of the wall support frames 124a, 124b to retain a desired angle for the backrest 114 and thereby provide a comfortable seating position for a user.

While the cutout 154 is illustrated as permitting the extended bolt 142 to move freely past the inwardly extended lower-rear portion of the wall support frame 124a or 124b, the bolts 142 of latches 128 may be operable to provide some resistance to assist in retaining the backrest 114 in the upright position or orientation when the system 110 is in the bench configuration. For example, the cutout 154 may be dimensioned and positioned differently such that the extended bolt 154 may not pass freely by the inwardly extended rear portion of the wall support frame 124a or 124b such that the user must retract the bolts 142 before moving the frame assembly 112 into the bench configuration. Once the bolts 142 have extended and been received into their respective cutouts 154, the bolt 142 would then be impeded from moving forward by the wall support frame 124a or 124b and would thus require the user to retract the bolt 142 to permit the frame assembly 112 to move from the bench configuration. Optionally, the bolt 142 may include a ramped front profile and a ramped back profile to permit automatic retraction of the bolt 142 at the strike and catch plate 146 as the frame assembly 112 approaches the bed configuration, and to permit automatic retraction of the bolt 142 at the inwardly extended rear portion of the wall support frame 124a or 124b as the frame assembly 112 approaches the bench configuration.

The orientation of the springs 122a, 122b, and the relative positions of the corresponding backrest attachment points 125 and eyelets 127 coordinate to provide an assisting force when deploying the system 110 from the bench to bed configuration and provide a damping force when stowing the system 110 from the bed to the bench configuration. When the frame assembly 112 is in the bench configuration, the springs 122a, 122b are extended or stretched, as illustrated at spring 122b in FIGS. 16 and 20 (in these views, spring 122a is depicted as separated from its respective eyelet 127 for illustrative purposes, as noted above). Thus, the springs 122a, 122b store energy when the system 110 is in the bench configuration. With the system released from the bench configuration, the springs 122a, 122b pull downward on the respective backrest attachment points 125, effectively drawing the attachment point 125 toward the eyelet 127. The tensile force on the backrest attachment point 125 causes the backrest 114 to pivot about the backrest support pins 130 in the manner sequentially illustrated in FIGS. 17B-17D. The springs 122a, 122b retract as the backrest 114 approaches its horizontal bed configuration so that the stored energy in the springs 122a, 122b decreases. Thus, the springs 122a, 122b assist the user in maneuvering the frame assembly 112 from the bench configuration to the bed configuration. Conversely, as the frame assembly 112 is moved from the bed configuration to the bench configuration, the springs 122a, 122b extend and the stored energy in the springs increases. The increasing energy provides a damping action against the backrest 114 as the backrest approaches its upright position of the bench configuration.

Figure 34:
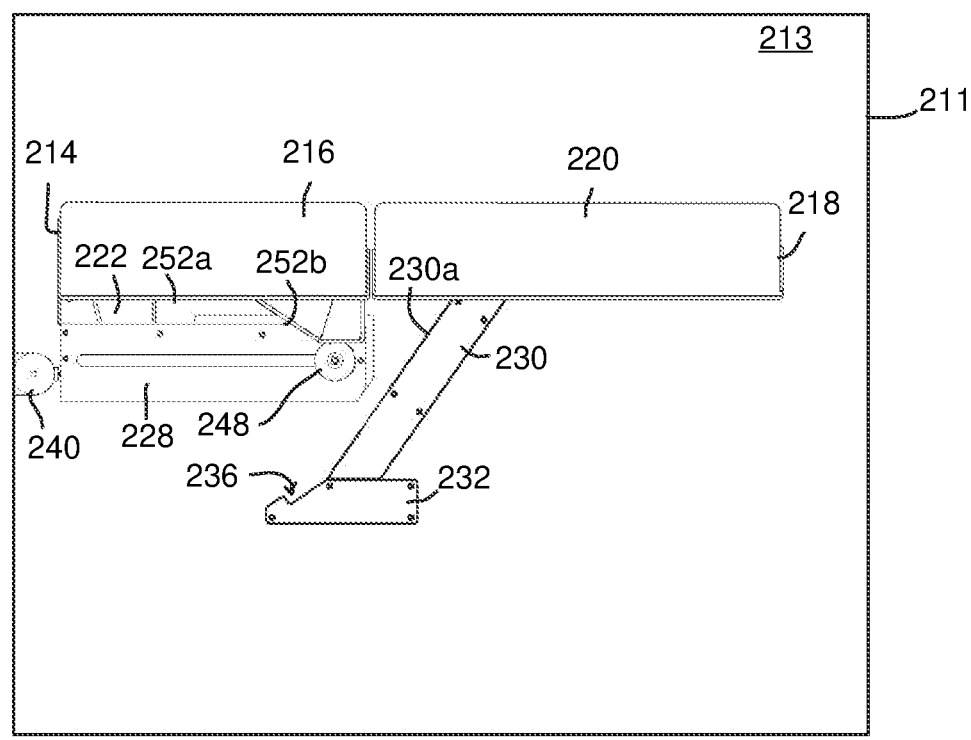
FIG. 34 is a sectional side elevation view of the convertible furniture system taken along Line XXXIV-XXXIV of FIG. 33.
Figure 35:
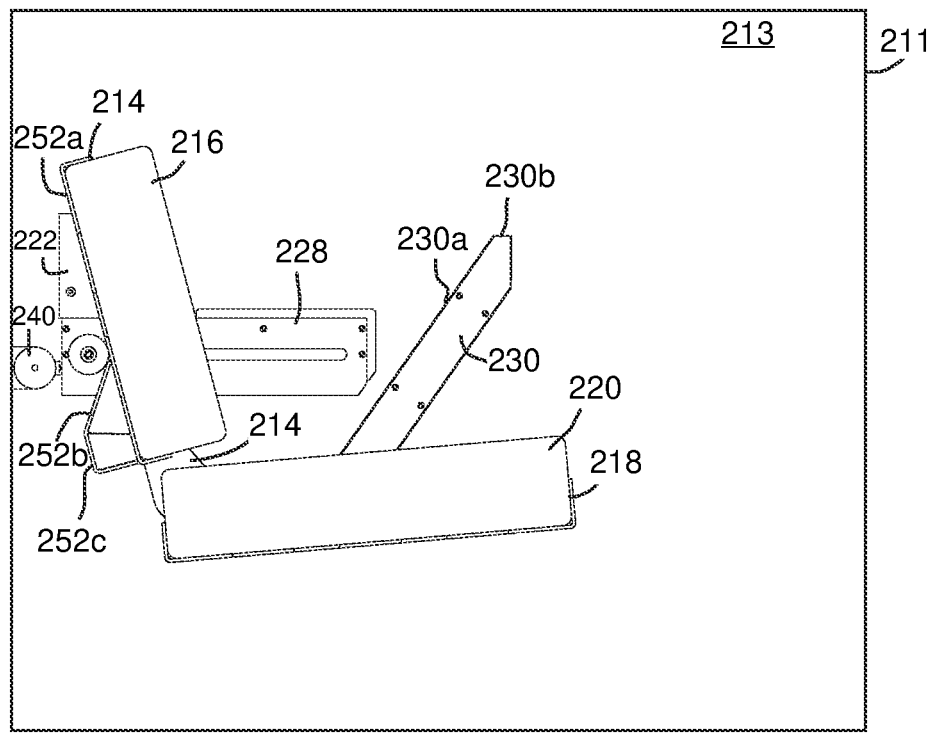
FIG. 35 is a sectional side elevation view of the convertible furniture system taken along Line XXXV-XXXIV of FIG. 29.

Referring to the illustrative embodiment of FIGS. 29-40, a motorized convertible furniture system 210 is provided for a living quarter 211 (FIGS. 33-36) and is configured similarly and functions in similar fashion to convertible furniture systems 10, 10a, 10b, and 110 as described above and illustrated in FIGS. 1-28. The motorized system 210 includes many identical or substantially similar components as compared to convertible furniture systems 10, 10a, 10b, and 110, with significant differences discussed hereinafter. The motorized system 210 includes a convertible frame assembly 212 with a backrest body or bench back frame 214 for supporting a back cushion 216 and a seat frame, body, or bench bottom 218 for supporting a seat cushion 220 (FIGS. 29-32E). The bench bottom 218 is pivotably coupled at or near its rearward or proximal portion or edge to the lower or distal portion or edge of the backrest 214 at a hinge or pivot pin 221 (FIGS. 29-32E, 36 and 38; viewing the frame assembly 212 in a bench configuration as illustrated in FIGS. 29-31A, and 32A, in which the backrest 214 is generally upright relative to upright walls of the living quarter). The bench bottom 218 and the backrest 214 coordinate to define a bed in a bed configuration as illustrated in FIGS. 31E and 32E-34, in which the bench bottom 218 and the backrest 214 are flat and generally parallel to each other as well as generally horizontal. Accordingly, in the bed configuration of 31E and 32E-34, the bench bottom 218 occupies a position that is superjacent$_{[BW1]}$ to the position it occupies when in the bench configuration of FIGS. 29-31A, and 32A. FIG. 35 illustrates the lower position of the bench bottom 218 in the bench configuration and FIG. 34 illustrates the higher position of the bench bottom 218 in the bed configuration. In the illustrated embodiment, when the frame assembly 212 is in the bed configuration (FIGS. 32E-34), the bench bottom 218 and backrest 214 are each elevated to a height that is equal to or about the same as the height of the upper or proximal portion of the backrest 214 when the system 210 is in the bench configuration (FIGS. 29-31A).

Each end of the frame assembly 212 is supported by portions of the living quarter 211, such as at opposing upright sidewalls 213, using frame assembly support frames, in the form of backrest supports 222, of a frame assembly support system (FIGS. 29-32E). Each frame assembly support frame 222 is mounted to a corresponding side wall 213, such as with mechanical fasteners in the form of screws 224 (FIGS. 31B-31E). An upper or proximal portion of a side stiffener 214a at each side end of the backrest 214 is pivotably coupled to the corresponding frame assembly support frame 222 at a backrest support pin 226 (FIGS. 29-32E). As such, the backrest 214 is pivotable relative to the support frames 222 about the backrest support pins 226. While the frame assembly 212 is described herein as supported at the upright sidewalls 213 of the living quarter 211, it will be appreciated that the upright side walls may form an integral portion of the furniture system 210. As such, the upright side walls may be attached to a structure within the vehicle living space 211. For example, the upright side walls may be bolted, welded, or otherwise fastened to a floor of the vehicle living space 211.

Figure 29:
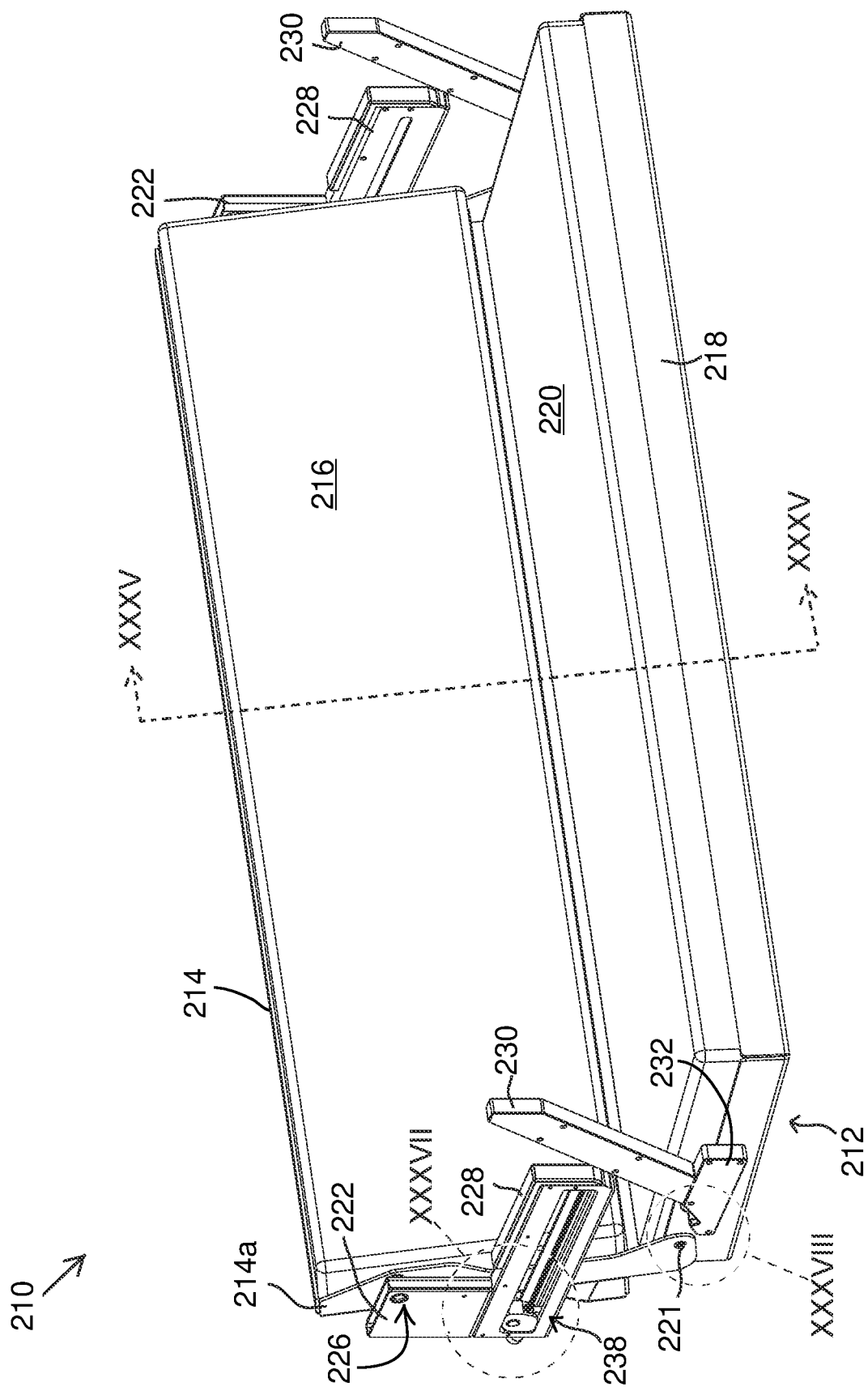
FIG. 29 is a front-side perspective view of a motorized convertible furniture system in accordance with the present invention, depicted in a bench configuration.
Figure 36:
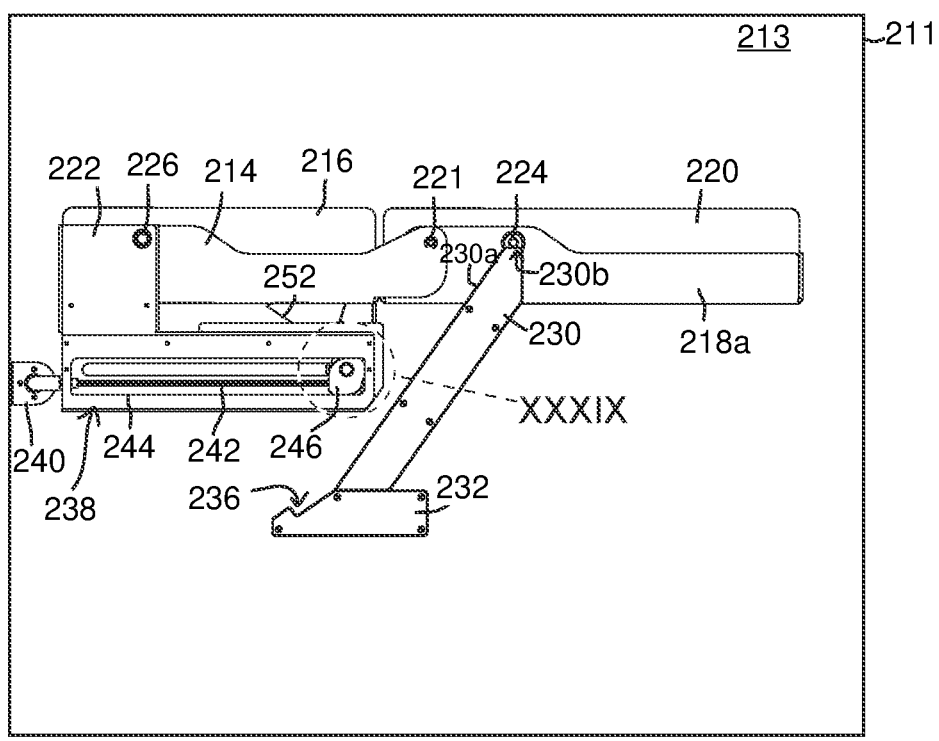
FIG. 36 is a side elevation view of the convertible furniture system of FIG. 29.

The frame assembly support system 210 includes a conversion track or guide system, in the form of a pair of horizontal back frame or backrest support tracks 228 and a pair bed supports or brackets, in the form of oblique bench bottom frame support guides 230 (FIGS. 29-35). The backrest support tracks 228 are each fixed to a portion of each sidewall 213 of the living space 211, such as with mechanical fasteners in the form of screws. The backrest support tracks 228 support and retain the backrest 214 in an upright orientation relative to the sidewalls when the furniture system 210 is in the bench configuration as illustrated in FIGS. 29-31A and 32A, and support and retain the backrest 214 in a flat or horizontal orientation relative to the sidewalls when the furniture system 210 is in the bed configuration (FIGS. 31E and 32E-34). The backrest support tracks 228 continuously support the backrest 214 as the furniture system 210 maneuvers or moves between the bench and bed configurations. The bench bottom support guides 230 are each fixed to a portion of the corresponding sidewall 213 of the living space 211, such as with mechanical fasteners in the form of screws. The support guides 230 extend upwardly and away from the bench bottom 218, when viewing the frame assembly 212 in the bench configuration. Lower-rear portions of the support guides 230 extend below forward ends of their corresponding backrest support tracks 228, middle portions of the support guides 230 are positioned in front of the forward ends of the backrest support tracks 228, and upper-forward portion of the support guides 230 extend above and forward of the forward ends of the backrest support tracks 228 (FIGS. 29 and 36). The bench bottom support guides 230 support the bench bottom 218 in a generally flat or horizontal orientation and substantially below the backrest 214 when the furniture system 210 is in the bench configuration, as illustrated in FIGS. 29-31A and 32A. The bench bottom support guides 230 support the bench bottom 218 in a flat or horizontal orientation and substantially parallel to the backrest 214 when the furniture system 210 is in the bed configuration (FIGS. 31E and 32E-34). The bench bottom support guides 230 support the bench bottom 218 as the furniture system 210 maneuvers or moves between the bench and bed configurations.

Figure 38:
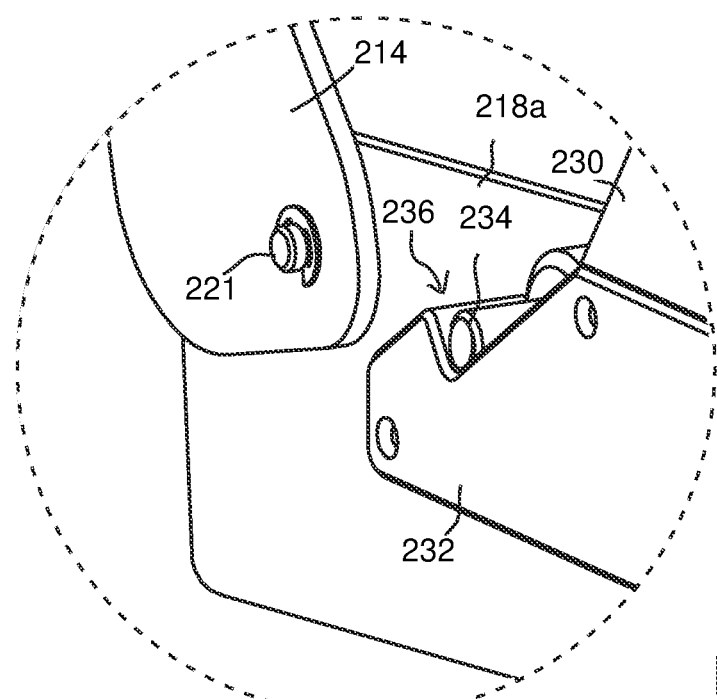
FIG. 38 is an enlarged view of the region designated XXXVIII in FIG. 29.

The frame assembly support system includes a pair of bench supports, in the form of bench bottom stops, indices, or rests 232, that are each fixed to a portion of each sidewall 213 of the living space 211, such as with mechanical fasteners in the form of screws (FIGS. 29-34). The rests 232 are positioned below their corresponding bench bottom support guide 230 and are provided for supporting and retaining a portion of the bench bottom 218 when the furniture system 210 is in the bench configuration as illustrated in FIGS. 29-31A and 32A. A bench bottom guide support pin or roller 234 is provided at each side stiffener 218a at the side ends of the bench bottom 218, as best shown in FIGS. 32A-32E, 36, and 38. An upwardly opening v-shaped notch 236 is provided near a rear portion of each rest 232 and provided for receiving, retaining, and supporting the corresponding bench roller 234 of the bench bottom 218 (FIGS. 32A and 38). The relative position of the notch 236 on the rest 232 and the relative position of the bench roller 234 on the side end of the bench bottom 218 enable the rest 232 and bench roller 234 to coordinate to retain the bench bottom in the horizontal orientation when the furniture system 210 is in the bench configuration. As illustrated in FIGS. 31B-31D and 32B-32D, the bench roller 234 is operable to follow or track along the upper surface of the bench bottom support guide 230 as the furniture system 210 maneuvers between the bench and bed configurations. Thus, the support guides 230 and the bench roller 234 moveably support the bench bottom 218 as the furniture system 210 actuates. As the furniture system 210 approaches the fully extended bed configuration, the roller rolls over a transition between the upper surface of an oblique portion 230a of the support guide 230 and onto an upper surface of an upper flat portion 230b of the support guide 230 (see sequence between FIGS. 32D and 32E). Once the furniture system 210 reaches the fully extended bed configuration, the bench roller 234 is vertically supported by the flat or horizontal upper portion 230b of the bench bottom support guide 230 (FIGS. 31E and 32E).

Figure 30:
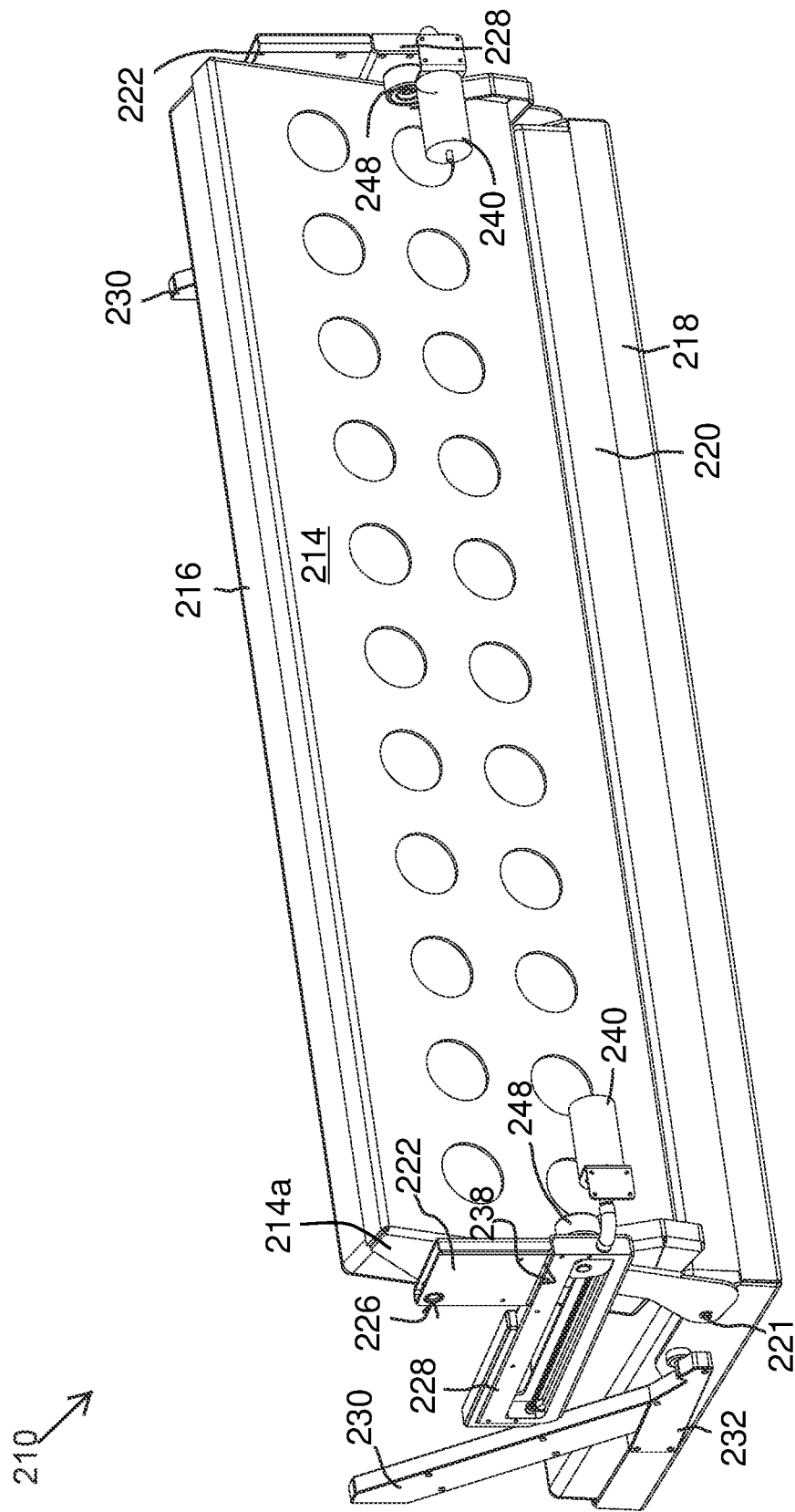
FIG. 30 is a rear-side perspective view of the convertible furniture system of FIG. 29.

An actuator or actuation system including a linear screw driven actuator 238 is integrated into each backrest support track 228 and is operably coupled to a drive motor 240 that is selectively operable to drive the actuator 238 (FIGS. 29 and 30). The actuator 238 is provided for driving the conversion or actuation (i.e. stowage and deployment) of the furniture system 210 between the bench and bed configurations. A lead or drive screw 242 of the actuator 238 is positioned inside an elongated channel or opening 244 formed in a middle portion of the backrest support track 228 (FIGS. 32A-32E, 37, and 39). The lead screw 242 is supported at each end at respective ends of the channel 244. The lead screw 242 is oriented with its longitudinal axis substantially horizontal and parallel to the upright side walls 213 of the living quarter. A drive nut 246 is coupled to the lead screw 242 (FIGS. 32A-32E, 37, and 39). The drive nut 246 may be keyed to a portion of the channel 244 to prevent rotation of the drive nut 246 relative to the backrest support track 228 as the lead screw 242 rotates to drive the drive nut 246 along the channel 244.

Figure 32A:
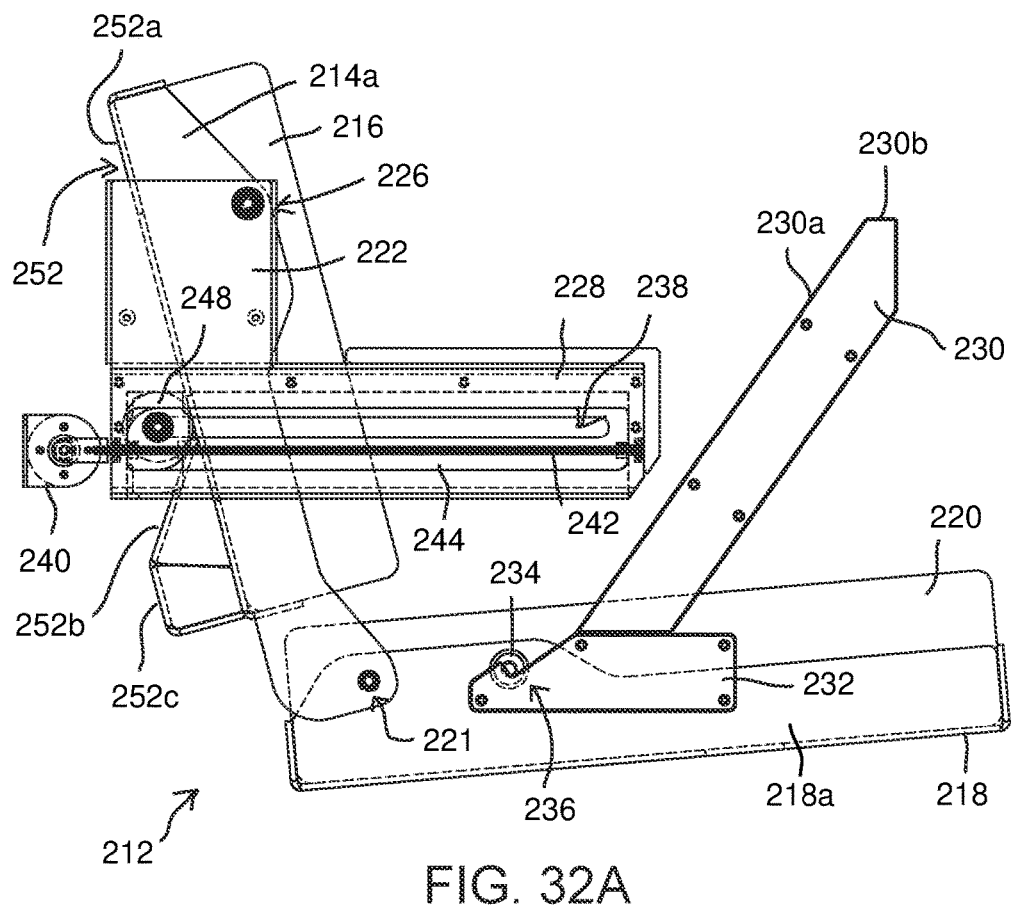
FIGS. 32A-32E are side elevation views of the convertible furniture system of FIG. 29, depicting sequential steps of deploying the convertible furniture system from the bench configuration to the flat, bed configuration, and depicted with obscured structure shown in phantom.
Figure 37:
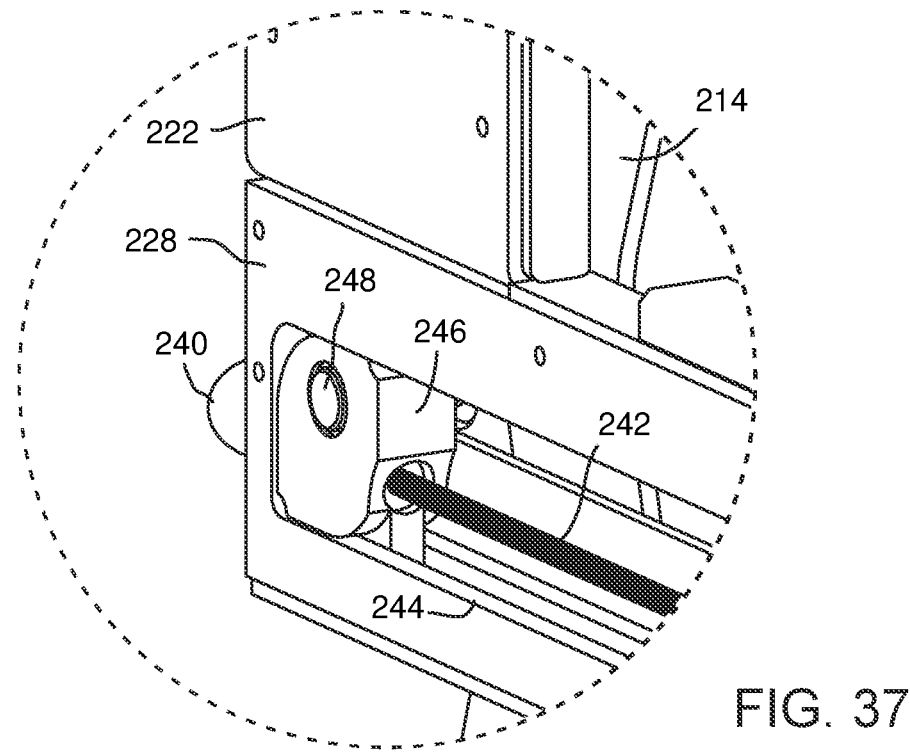
FIG. 37 is an enlarged view of the region designated XXXVII in FIG. 29.
Figure 39:
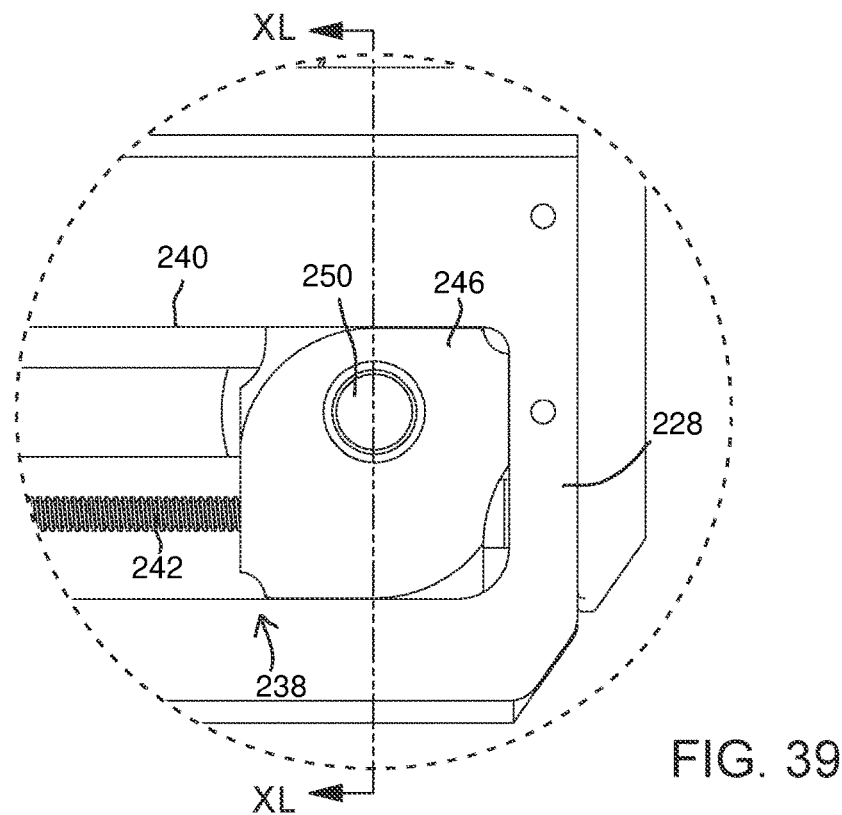
FIG. 39 is an enlarged view of the region designated XXXIX in FIG. 36.
Figure 40:
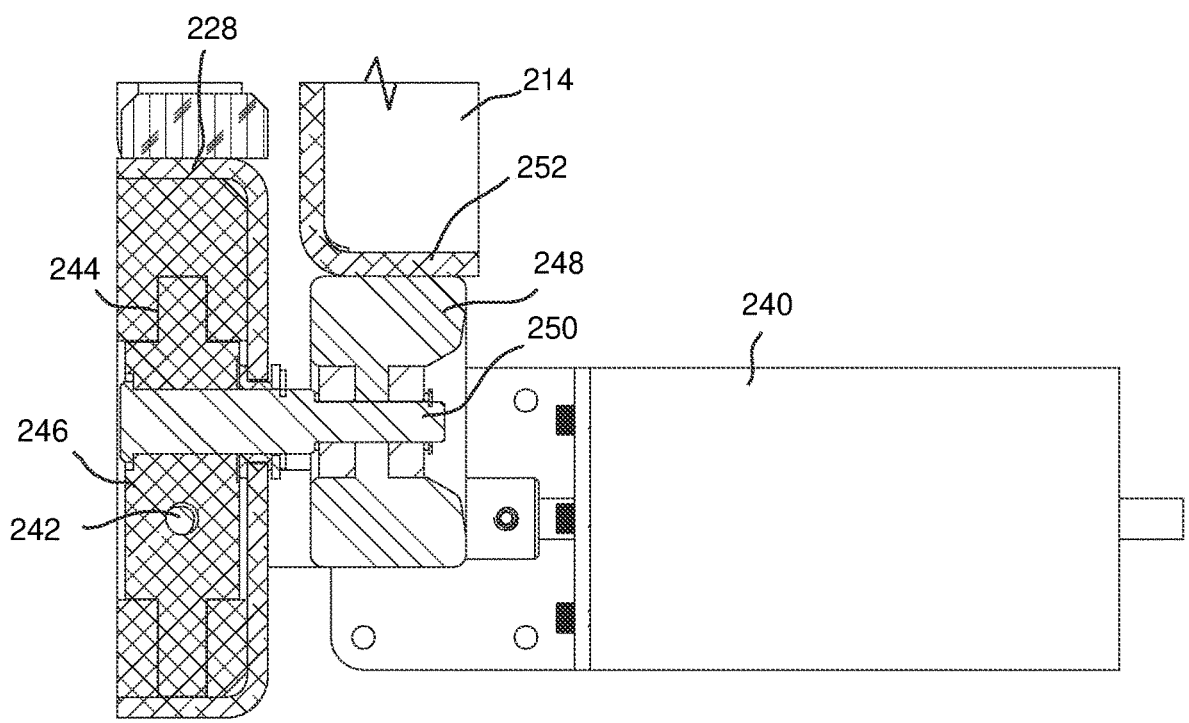
FIG. 40 is a sectional view of the convertible furniture system taken along Line XL-XL of FIG. 39.

A backrest or conversion support roller 248 (FIG. 30) is coupled to the drive nut 246 of each of the actuators 238 via a pin or shaft 250 (FIGS. 37 and 39). As the lead screw 242 drives the drive nut 246 along the channel 244, the backrest roller moves along with the drive nut in a horizontal path defined by the travel path of the drive nut 246 relative to the lead screw 242. As illustrated in the actuation or conversion sequence of FIGS. 32A-32E (in which relative movement directions of the backrest and bench bottom are illustrated in phantom), the backrest rollers 248 are substantially in continuous contact with a respective contoured following surface or follower 252 defined at each side end of the rear surface of the backrest 214. As best illustrated in FIG. 32A, the follower 252 is defined by an upper portion of the backrest 252a that is co-planar with a majority of the flat rear surface of the backrest 214, an oblique ramped portion 252b that extends obliquely away from the upper portion 252a, and an extended end portion that extends from the lower end of the ramped portion 252b and is offset from and substantially parallel to a lower or distal portion of the flat rear surface of the backrest 214. With the furniture system 210 stowed in the bench configuration of FIG. 32A, the roller 248 is positioned at the intersection of the upper portion 252a and the ramped portion 252b of the follower 252.

Figure 31A:
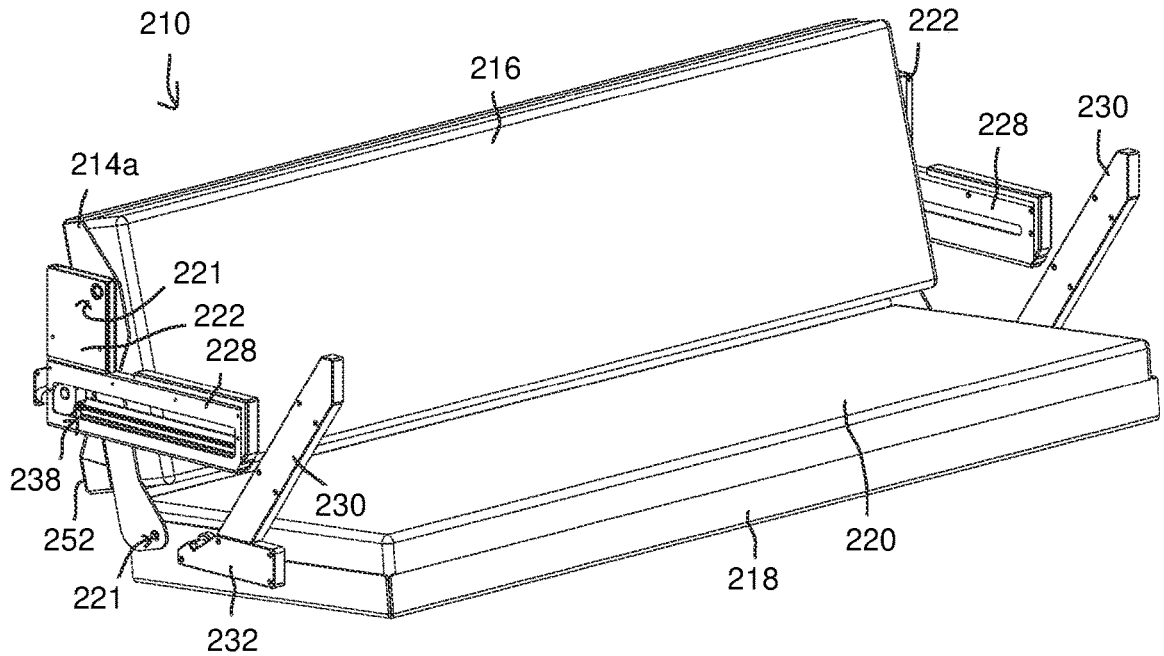
FIGS. 31A-31E are front-side perspective views of the convertible furniture system of FIG. 29, depicting sequential steps of deploying the convertible furniture system from the bench configuration to a flat, bed configuration.
Figure 31B:
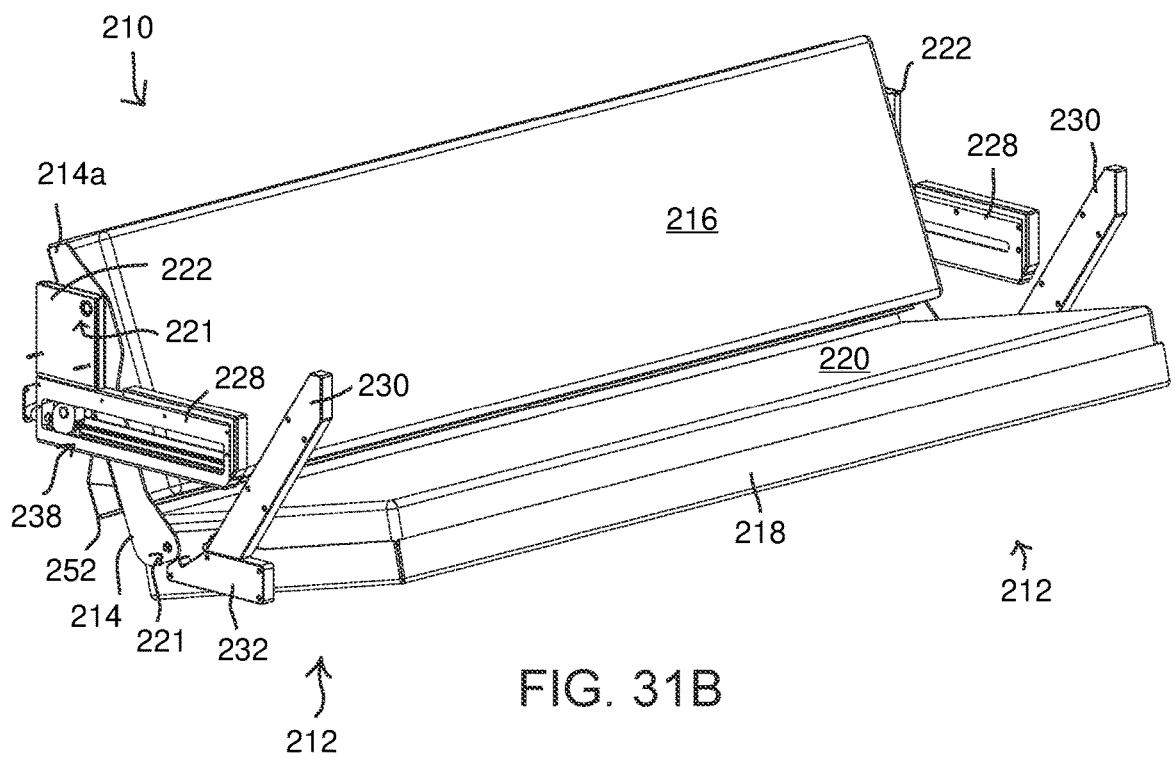
Figure 31C:
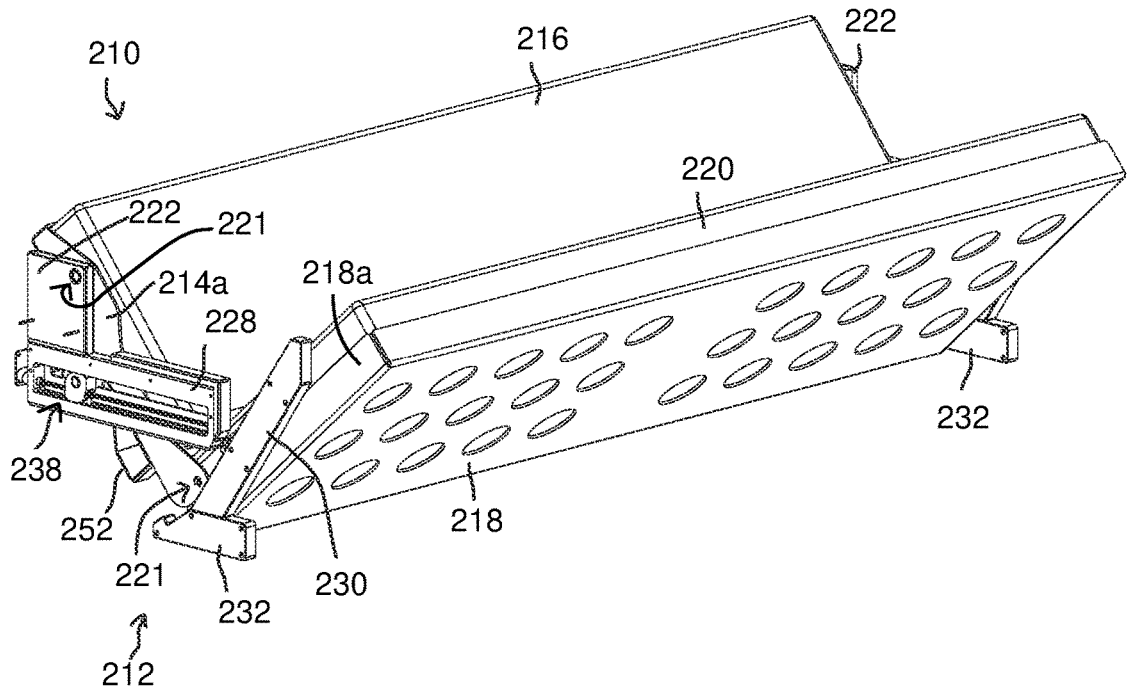
Figure 31D:
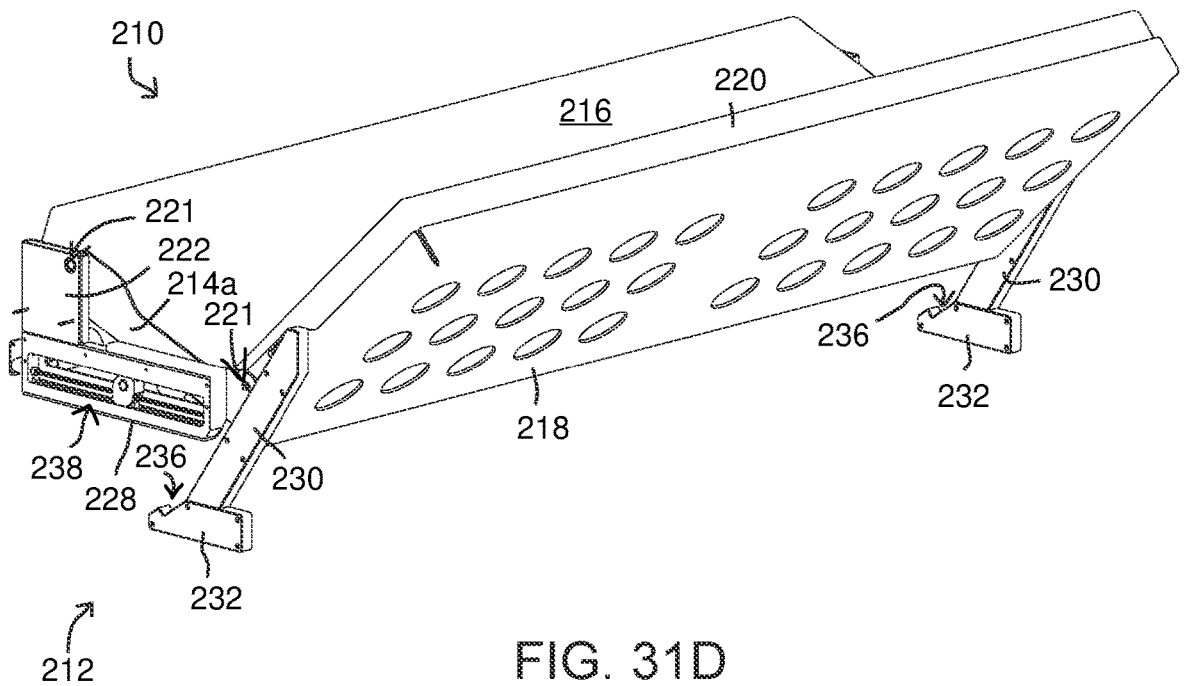
Figure 31E:
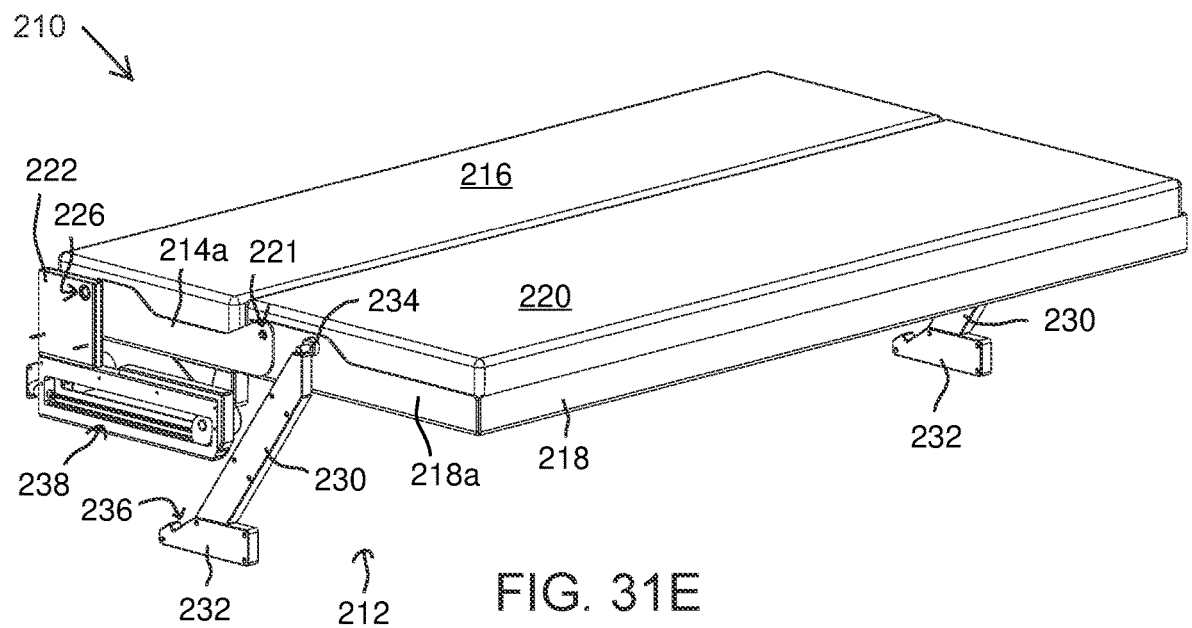
Figure 32B:
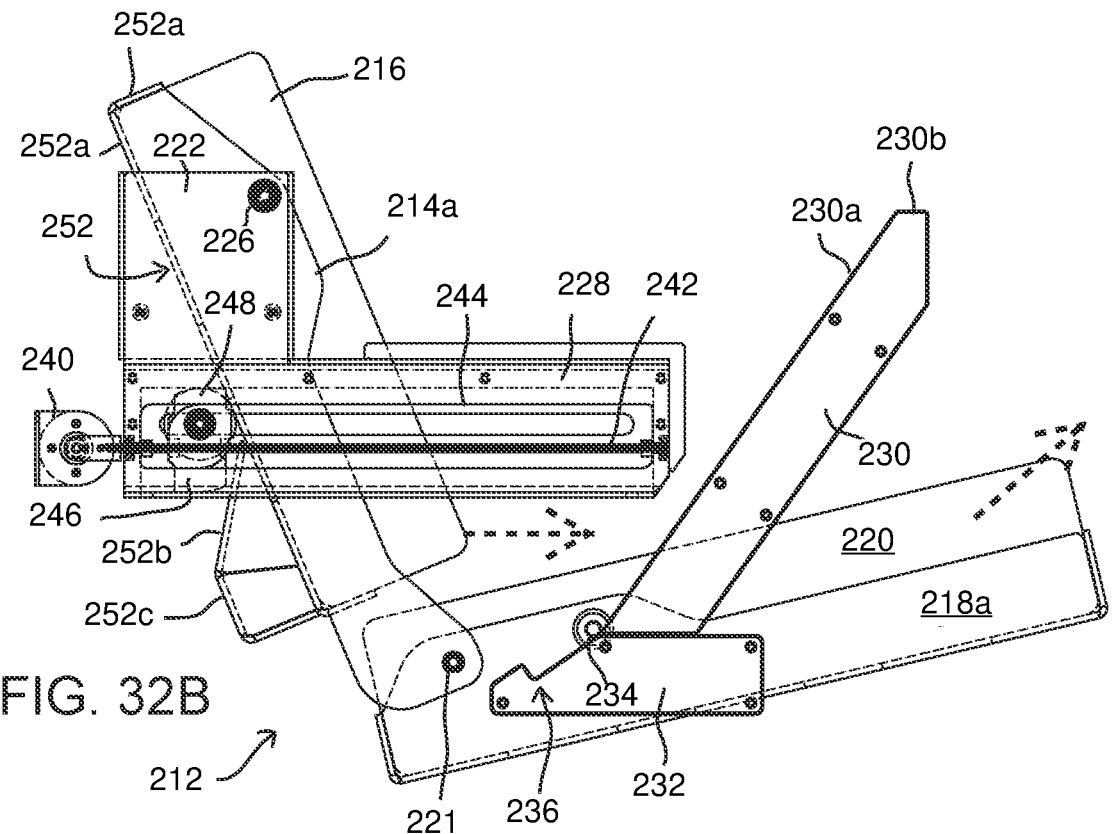
Figure 32C:
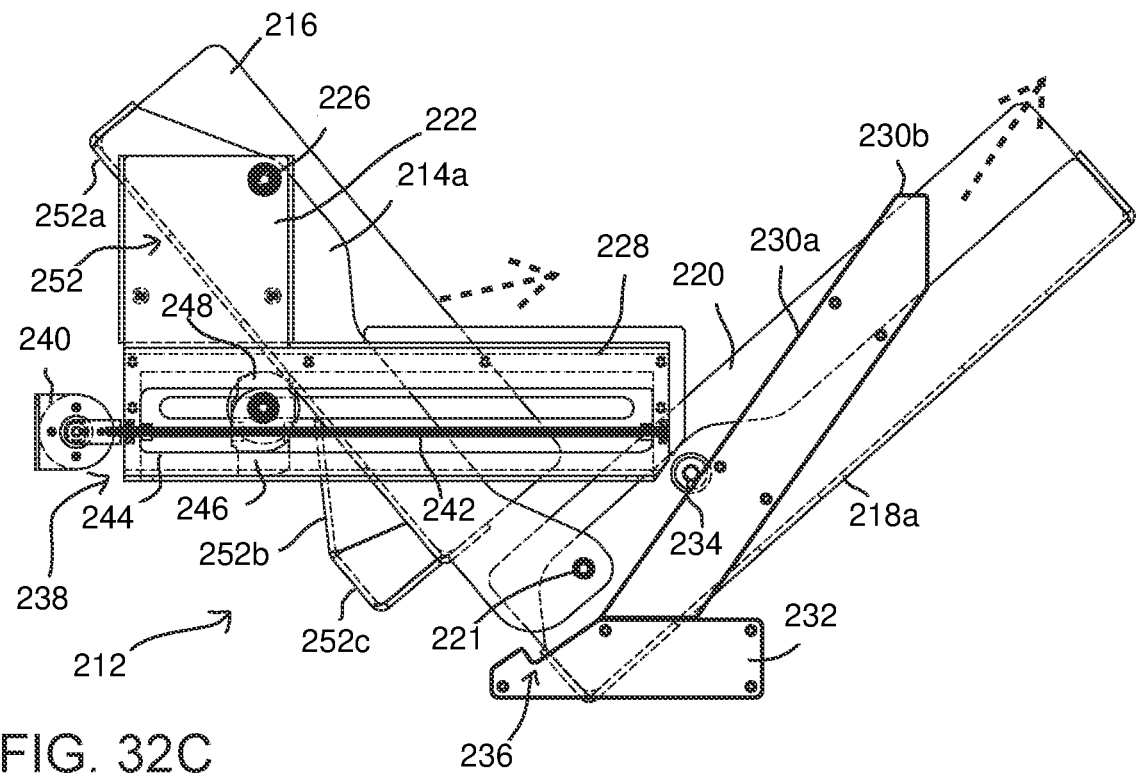
Figure 32D:
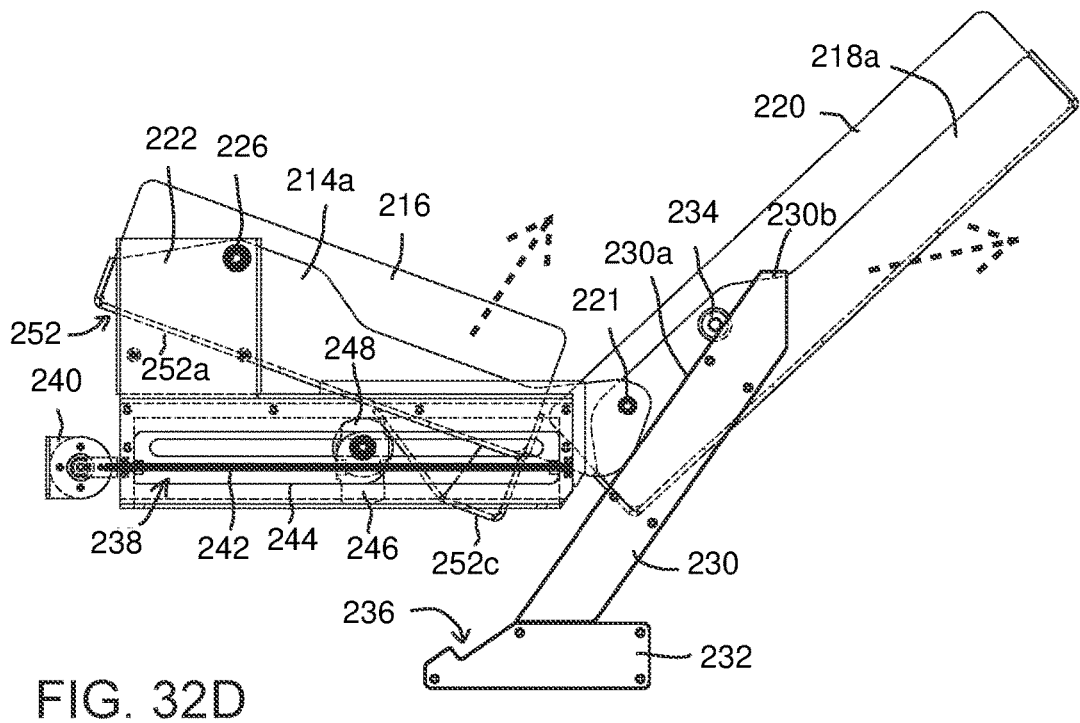
Figure 32E:
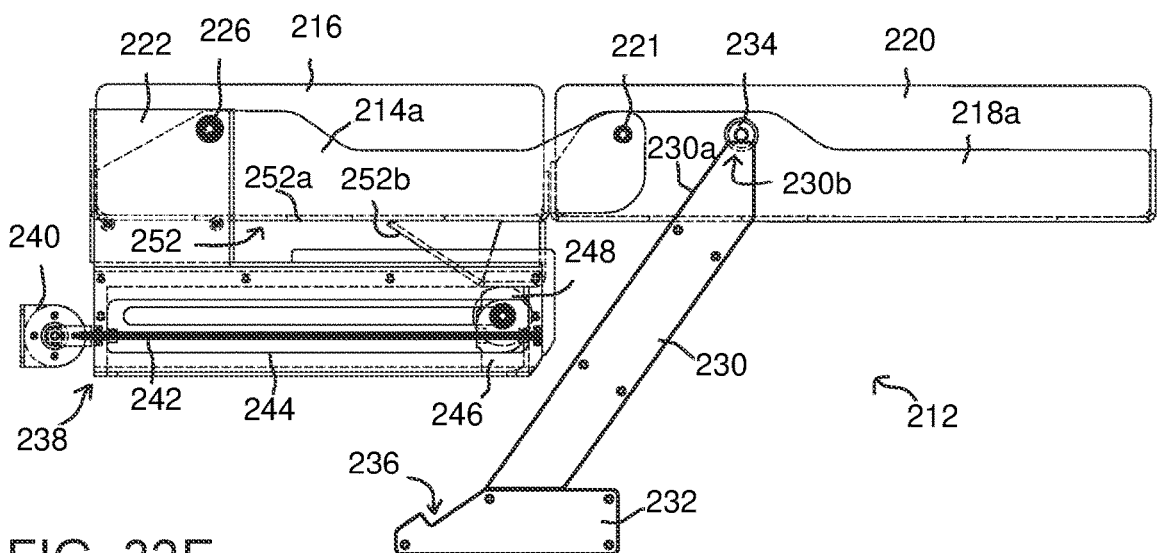
Figure 33:
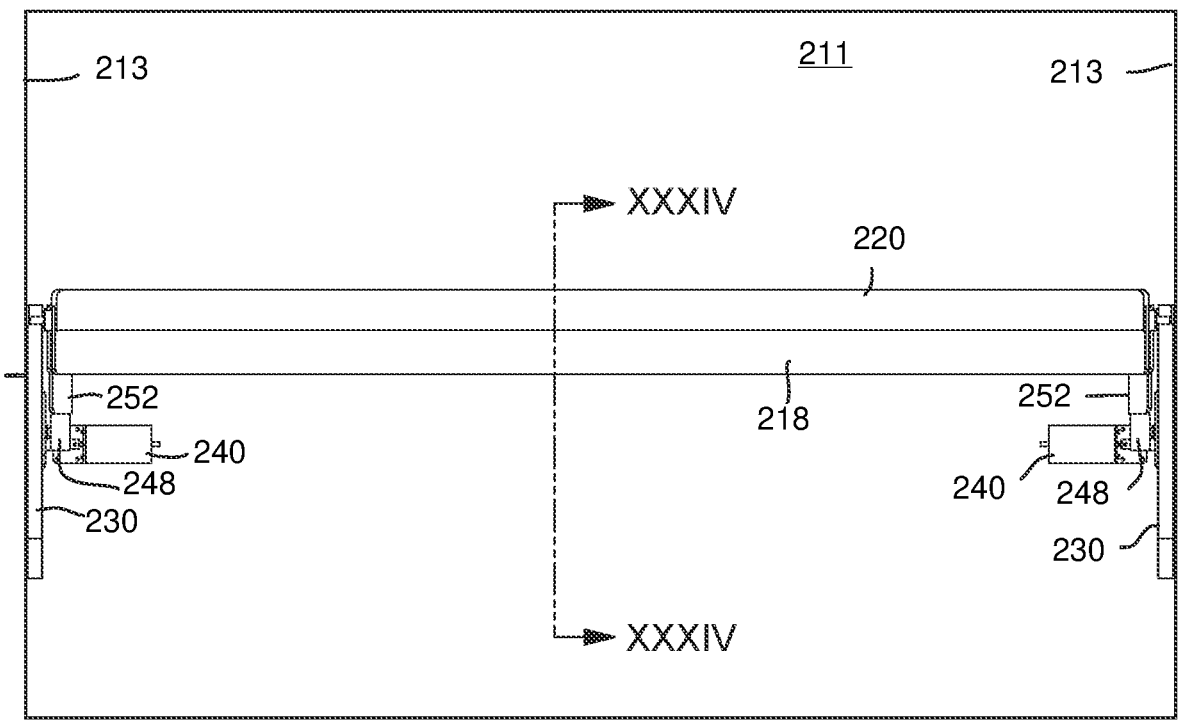
FIG. 33 is a front elevation view of the convertible furniture system of FIG. 31E.

As the motor 240 drives the lead screw 242, the drive nut 246 and roller 248 move forward and the roller 248 urges the backrest 214 to pivot about the backrest support pin 226, causing the lower portion of the backrest 214 to move forward (FIGS. 32B and 32C). As the drive nut 246 and roller 248 continue to travel forward, the roller 248 meets the ramped portion 252b of the follower 252 (FIG. 32D). As the drive nut 246 and roller 248 continue further forward, the roller 248 urges the ramped portion 252b forward, thereby causing the lower portion of the backrest 248 to move upwardly and forwardly away from the roller 248. When the frame assembly 212 has reached the fully extended bed configuration, the extended portion 252c rests on the roller 248. Once the furniture system 210 reaches the fully extended bed configuration, the extended portion 252c of the follower 252 and the backrest roller 248 cooperate to support the backrest 214 in its horizontal orientation (FIGS. 31E, 32E, and 34). Accordingly, the linear screw driven actuator 238 and drive motor 240 are selectively operable to automatically deploy and stow the furniture system 210 between its bed and bench configurations. The linear actuator may be supplemented with a spring and/or damping mechanism to assist with deployment and retraction of the system 210 and/or to provide a damping force when stowing or extending the system 210. For example, tension springs may be provided with system 210 similar to tension springs 122a, 122b described above for furniture system 110 and illustrated in FIGS. 16 and 18-20. It will be appreciated that an actuator may be provided with any of the above described furniture systems, including systems 10, 10a, and 10b described above and illustrated in FIGS. 1-14.

Thus, the convertible furniture systems of the present invention provides a user a selectively deployable futon that is installed into or integrated with a living space or a vehicle living quarter, such as a truck bed mounted camper unit. The system is operable to maneuver between a bench configuration that provides upright seating and a flat, bed configuration that provides a flat and substantially horizontal bed. The system may include various supports that are selectively operable and/or selectively engageable to secure and support the system in each of the static bench and bed configurations and/or to support the system during deployment and stowage between the static configurations. Extendable support legs may be included to support portions of the convertible furniture system against a floor surface subjacent to the system. The system may include guides or tracks to direct the movement of the system's frame assembly as it is maneuvered between the bed and bench configurations. The system may also include an actuation system with a motor to automatically deploy and stow the furniture system.

Changes and modifications in the specifically described embodiments can be carried out without departing from the principles of the present invention, which is intended to be limited only by the scope of the appended claims, as The embodiments of the invention in which an exclusive property is claimed are defined as follows:

1. A convertible furniture system for recreational vehicles, said convertible furniture system comprising:
    a convertible frame assembly comprising:
        a back frame having proximal and distal edge regions and opposite side ends, said proximal edge region pivotably configured for coupling to at least one of a plurality of upright walls at one of said side ends; and
        a bottom frame having a proximal edge region coupled to said distal edge region of said back frame at a hinge;
        said frame assembly selectively operable to extend and retract between a bench configuration and a flat configuration;
        wherein a distal edge region of said bottom frame defines a front of said convertible frame assembly in each of said bench and flat configurations and said proximal edge region of said back frame defines a top of said convertible frame assembly in said bench configuration; and
    a frame assembly support system configured for coupling to at least one of the upright walls adjacent at least one of said side ends of said frame assembly and pivotably supporting said frame assembly proximate said proximal edge region of said back frame, said frame assembly support system operable to retain said frame assembly in one or both of said bench configuration and said flat configuration;
    wherein in said bench configuration said back frame is upright and said bottom frame extends laterally from said distal edge region of said back frame; and
    wherein in said flat configuration said back frame and said bottom frame are configured to be perpendicular to the upright walls, and are adjacent and parallel to one another, such that a position of said bottom frame in said flat configuration is superjacent to a position of said bottom frame in said bench configuration.

2. The convertible furniture system of claim 1, wherein said frame assembly support system comprises a conversion track configured to retain said back frame at each of said bench configuration and said flat configuration, and to movably support said back frame as said frame assembly extends and retracts between said bench configuration and said flat configuration.

3. The convertible furniture system of claim 2, wherein said conversion track comprises a horizontal back frame support track having a linear actuator selectively operable to extend and retract said frame assembly between said bench configuration and said flat configuration.

4. The convertible furniture system of claim 3, wherein said linear actuator comprises:
    a horizontal drive screw;
    a drive nut moveably coupled to said drive screw; and
    a conversion roller coupled to said drive nut such that said roller moves with said drive nut, and said roller travels along a follower at a side end of a rear portion of said back frame;
    wherein said drive nut and said roller are movable forward such that said roller urges said back frame to move from one orientation when in said bench configuration toward another orientation when in said flat configuration; and
    wherein said drive nut and said roller are movable rearward such that said roller supports said back frame as it moves from its flat configuration orientation toward its bench configuration orientation.

5. The convertible furniture system of claim 3, wherein said conversion track further comprises an oblique guide disposed proximate a forward portion of said linear actuator and extending obliquely from below a portion of said linear actuator to above a portion of said linear actuator, said oblique guide configured to support a portion of said bottom frame to retain said bottom frame in a generally horizontal orientation when said frame assembly is in each of said bench configuration and said flat configuration, said oblique guide further configured to moveably support said bottom frame as said frame assembly extends and retracts between said bench configuration and said flat configuration.

6. The convertible furniture system of claim 5, further comprising a support roller coupled to a side end portion of said bottom frame and configured to moveably support said bottom frame at said oblique guide as said frame assembly extends and retracts between said bench configuration and said flat configuration.

7. The convertible furniture system of claim 6, wherein said conversion track comprises a bottom frame index disposed at a lower end of said oblique guide and configured to receive and retain said support roller when said frame assembly is in said bench configuration.

8. The convertible furniture system of claim 2, wherein said conversion track comprises a pair of slotted bench back brackets configured to be disposed on respective opposing ones of the upright walls, wherein said back frame is pivotably and slideably supported proximate its proximal edge region between said slotted bench back brackets.

9. The convertible furniture system of claim 8, further comprising a guide pin at opposite side ends of said back frame, and wherein each of said slotted bench back brackets defines a horizontal slide slot configured to vertically support a corresponding one of said guide pins, wherein each of said guide pins is operable to freely rotate and slide inside of a corresponding one of said slide slots during extension and retraction of said frame assembly.

10. The convertible furniture system of claim 1, wherein said frame assembly support system comprises a pair of generally rectangular frames configured to be coupled to opposing ones of the upright walls, each of said rectangular frames having (i) a mounting surface configured to be positioned alongside the corresponding upright wall, and (ii) a plurality of extended portions positioned inboard of the respective upright wall and spaced apart from said mounting surface, said plurality of extended portions comprising an upright extension at an upper-rear portion of said rectangular frame, wherein said back frame is pivotably coupled at each of its side ends proximate its proximal edge region to respective ones of said upright extensions.

11. The convertible furniture system of claim 10, further comprising:
    a bottom frame support pin coupled to a side end portion of said bottom frame;
    a bottom frame bench index defined by a notch formed in one of said plurality of extended portions that is located at a lower-middle portion of said rectangular frame; and
    a bottom frame flat index defined by a notch formed in one of said plurality of extended portions which is located at an upright extension of an upper-forward portion of said rectangular frame;
    wherein said bench index is configured to receive and retain said bottom frame support pin to thereby retain said bottom frame in a generally horizontal orientation when said frame assembly is in said bench configuration, and said flat index is configured to receive and retain said bottom frame support pin to thereby retain said bottom frame in a generally horizontal orientation when said frame assembly is in said flat configuration.

12. The convertible furniture system of claim 1, further comprising a conversion assist mechanism coupled between said back frame and said frame assembly support system and operable to apply forces to said frame assembly during extending and retracting of said frame assembly between said bench configuration and said flat configuration.

13. The convertible furniture system of claim 12, wherein said conversion assist mechanism comprises a tension spring having one end coupled to a lower-rear portion of said frame assembly support system and having an opposite end coupled proximate said proximal edge region of said back frame.

14. The convertible furniture system of claim 1, wherein said frame assembly support system comprises at least one pair of bed supports that support a side end portion of said frame assembly when in said flat configuration, and a pair of bench supports that support a side end portion of said bottom frame when in said bench configuration, wherein said bed supports and said bench supports are configured to be disposed on respective opposing ones of the upright walls.

15. The convertible furniture system of claim 14, further comprising an engagement element coupled to a portion of said frame assembly, said engagement element comprising a latch assembly disposed on a side end of either said back frame or said bottom frame, said latch assembly operable to engage a corresponding one of said bench supports when said frame assembly is in said bench configuration and/or a corresponding one of said bed supports when said frame assembly is in said flat configuration.

16. The convertible furniture system of claim 1, wherein said furniture system comprises at least one of the plurality of upright walls.

17. The convertible furniture system of claim 16, wherein said at least one of the plurality of upright walls defines a portion of a living space of the recreational vehicle.

18. A convertible furniture system operable to extend and retract between a bench configuration and a flat bed configuration, said convertible furniture system comprising:
a back frame pivotably coupled between a pair of opposing upright walls of a living space, said back frame having longer proximal and distal edges extending between the upright walls and shorter side ends that are adjacent to respective ones of the upright walls;
a bottom frame pivotably coupled to said back frame at a hinge, said bottom frame having longer proximal and distal edges extending between the upright walls and shorter side ends that are adjacent to respective ones of the upright walls;
said back frame and said bottom frame define a convertible frame assembly that is pivotable about said hinge and repositionable between a bench configuration in which said back frame is upright relative to the upright walls of the living space, and a flat configuration in which said back frame is parallel to said bottom frame and a position of said bottom frame is superjacent to a position of said bottom frame in said bench configuration; and
an actuator configured to urge said distal edge of said back frame forward and/or upward during extension of said frame assembly and configured to perform at least one chosen from (i) provide a damping action proximate said distal edge of said back frame as it moves downward and/or rearward during retraction of said frame assembly, and (ii) control the movement of said distal edge of said back frame as said distal edge moves downward or rearward during retraction of said frame assembly.

19. The convertible furniture system of claim 18, wherein said actuator comprises at least one of a spring and a motorized linear actuator.

20. The convertible furniture system of claim 19, further comprising a frame assembly support system coupled to at least one of the upright walls and pivotably supporting said frame assembly, said frame assembly support system comprises a conversion track configured to retain said back frame at each of said bench configuration and said flat configuration and movably support said back frame as said frame assembly extends and retracts between said bench configuration and said flat configuration.

21. The convertible furniture system of claim 20, wherein said conversion track comprises a horizontal back frame support track and said actuator comprises said motorized linear actuator, wherein said motorized linear actuator and said horizontal back frame support track are configured to cooperate with one another to extend and retract said frame assembly between said bench configuration and said flat configuration.

22. A convertible furniture system that is convertible between a bench and a flat bed, said convertible furniture system comprising:
a convertible frame assembly comprising:
a back frame moveable between an upright orientation and a horizontal orientation; and
a bottom frame pivotably coupled to said back frame at a hinge;
wherein said frame assembly is selectively operable to extend and retract between a bench configuration in which said back frame is in said upright orientation and a bed configuration in which said back frame is in said horizontal orientation and said bottom frame is in a horizontal orientation and parallel to said back frame; and
a frame assembly support system configured for coupling to at least one upright wall, said frame assembly comprising:
a conversion track operable to support a portion of said back frame at each of said bench configuration and said bed configuration, and to movably support said back frame such that said back frame is moveable between said bench configuration and said bed configuration;
a back frame support defining an upper-rear portion of said frame assembly support system and configured to pivotably support an upper portion of said back frame at each of said bench configuration and said bed configuration, and to pivotably support said back frame as it moves between said bench configuration and said bed configuration, wherein said back frame support is spaced apart from said hinge of said frame assembly;
a bottom frame bench support configured to selectively retain a portion of said bottom frame in said bench configuration; and
a bottom frame bed support configured to selectively retain a portion of said bottom frame in said, bed configuration.

23. The convertible furniture system of claim 22, wherein said furniture system comprises the at least one upright wall.

\* \* \* \* \*

UNITED STATES PATENT AND TRADEMARK OFFICE
CERTIFICATE OF CORRECTION

Page 1 of 1

PATENT NO.         : 12,065,070 B2
APPLICATION NO.    : 17/687055
DATED              : August 20, 2024
INVENTOR(S)        : Cal G. Niemela et al.

It is certified that error appears in the above-identified patent and that said Letters Patent is hereby corrected as shown below:

In the Claims

Column 24, Claim 22:
Line 66, delete "," after --in said--

Signed and Sealed this
Twenty-fourth Day of September, 2024

Katherine Kelly Vidal
*Director of the United States Patent and Trademark Office*